(12) United States Patent
Cho

(10) Patent No.: US 10,891,875 B2
(45) Date of Patent: Jan. 12, 2021

(54) METHOD, DEVICE, AND NON-TRANSITORY COMPUTER-READABLE MEDIUM FOR CONTROLLING TACTILE INTERFACE DEVICE

(71) Applicant: GACHON UNIVERSITY-INDUSTRY FOUNDATION, Seongnam-si (KR)

(72) Inventor: Jin Soo Cho, Seoul (KR)

(73) Assignee: GACHON UNIVERSITY-INDUSTRY FOUNDATION, Seongnam-si (KR)

( * ) Notice: Subject to any disclaimer, the term of this patent is extended or adjusted under 35 U.S.C. 154(b) by 405 days.

(21) Appl. No.: 15/889,706

(22) Filed: Feb. 6, 2018

(65) Prior Publication Data

US 2018/0165989 A1  Jun. 14, 2018

Related U.S. Application Data

(63) Continuation of application No. PCT/KR2017/001190, filed on Feb. 3, 2017.

(30) Foreign Application Priority Data

Aug. 19, 2016 (KR) ................ 10-2016-0105466

(51) Int. Cl.
*G09B 21/00* (2006.01)
*G06F 3/01* (2006.01)

(52) U.S. Cl.
CPC ............ *G09B 21/007* (2013.01); *G06F 3/01* (2013.01); *G09B 21/003* (2013.01); *G09B 21/005* (2013.01)

(58) Field of Classification Search
CPC ........ G09B 21/03; G09B 21/04; G09B 21/25; G09B 21/003; G09B 21/007
See application file for complete search history.

(56) References Cited

U.S. PATENT DOCUMENTS

| 9,812,033 | B2 | 11/2017 | Chari et al. | |
|---|---|---|---|---|
| 2012/0151349 | A1 | 6/2012 | Hahm et al. | |
| 2012/0214139 | A1* | 8/2012 | Murphy | G09B 21/003 434/114 |
| 2012/0315607 | A1 | 12/2012 | Shin et al. | |
| 2013/0157230 | A1 | 6/2013 | Morgan | |
| 2015/0379895 | A1* | 12/2015 | Chari | G09B 21/004 434/114 |

(Continued)

FOREIGN PATENT DOCUMENTS

| KR | 10-2011-0063600 A | 6/2011 |
|---|---|---|
| KR | 10-2012-0063982 A | 6/2012 |

(Continued)

*Primary Examiner* — James S. McClellan
(74) *Attorney, Agent, or Firm* — Studebaker & Brackett PC

(57) ABSTRACT

The present invention relates to a method, a device, and a non-transitory computer-readable medium for controlling a tactile interface device. The method of controlling the tactile interface device according to an embodiment of the present invention includes an input information generating step of generating input information into an application being executed in the computing device based on an input from the tactile interface device; and an output information generating step of generating output information to the tactile interface device based on an output of a focus area among an output from the application being executed in the computing device.

12 Claims, 27 Drawing Sheets

| Index | Tactile icon | Text |
|---|---|---|
| 1 | Title | HapticEditor |
| 2 | Button 1 | Main menu |
| 3 | Button 2 | Minimize |
| 4 | Button 3 | Close |
| 5 | Tactile Graphic | - |

(56) References Cited

U.S. PATENT DOCUMENTS

2016/0034180 A1* 2/2016 Labbe .................. G06F 3/0484
                                                                                345/173
2016/0163230 A1* 6/2016 Yoon ................... G09B 21/025
                                                                                434/114

FOREIGN PATENT DOCUMENTS

| KR | 10-2012-0136642 A | 12/2012 |
| KR | 10-2015-0123932 A | 11/2015 |
| KR | 10-2016-0097414 A | 8/2016 |

\* cited by examiner

FIG. 16

| GUI elements | Visual design | Tactile icon |
|---|---|---|
| Button | Button | |
| Text label | Text label | |
| Text input box | Text box | |
| Folder | | |
| File | | |
| Title | HapticEditor | |
| Menu | Page control obje Next Page Previous Page | |

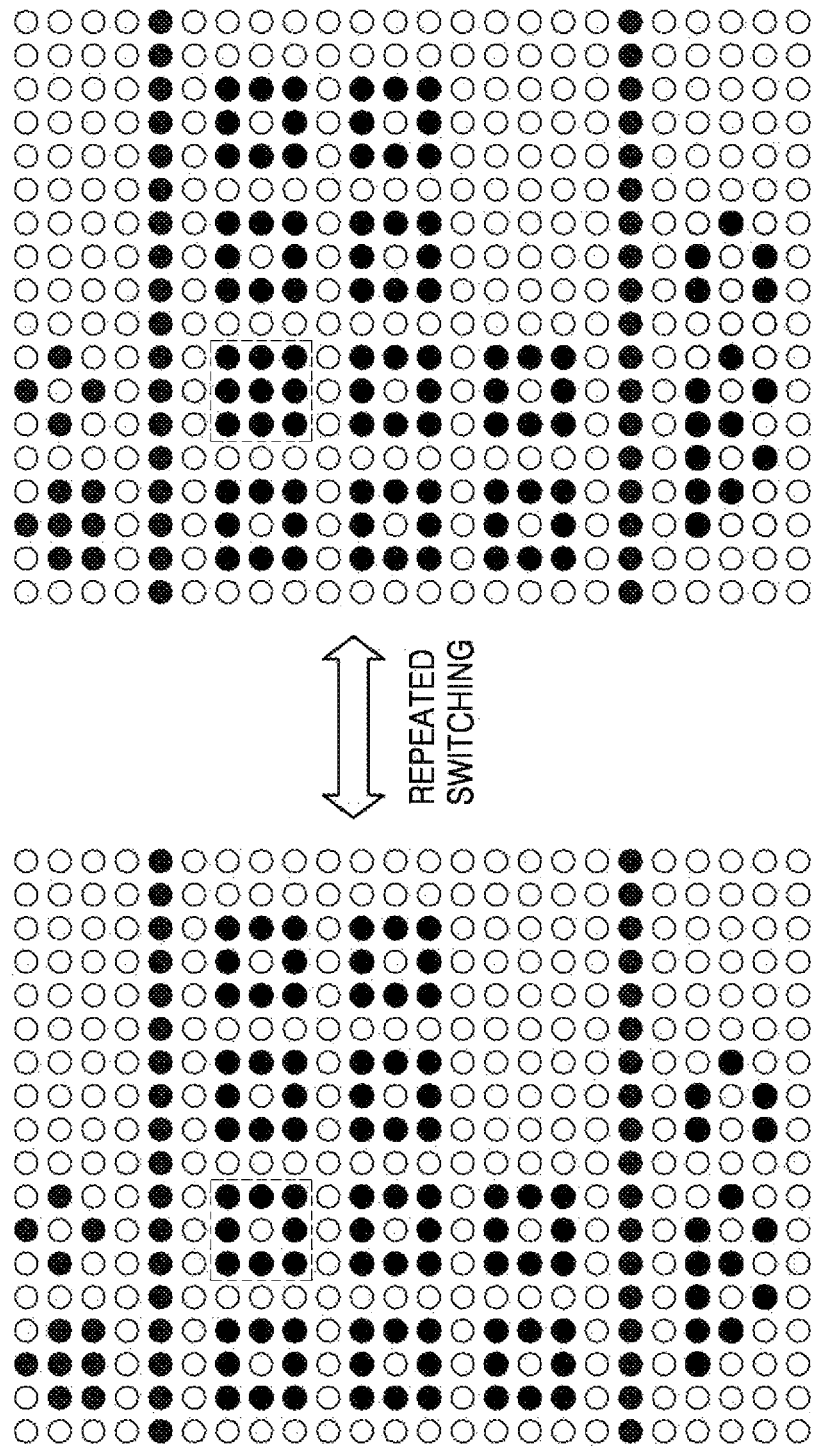

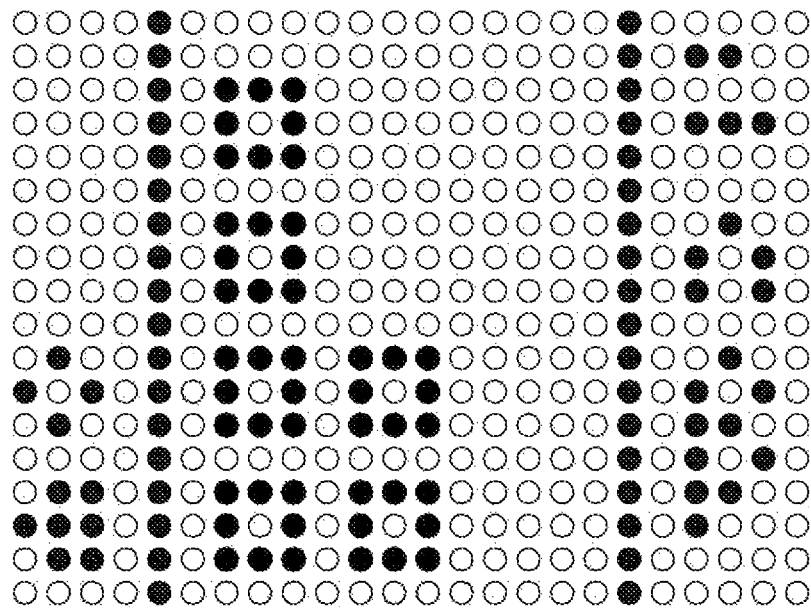
FIG. 23B
ENTER AN EXECUTION KEY (DOUBLE CLICK)
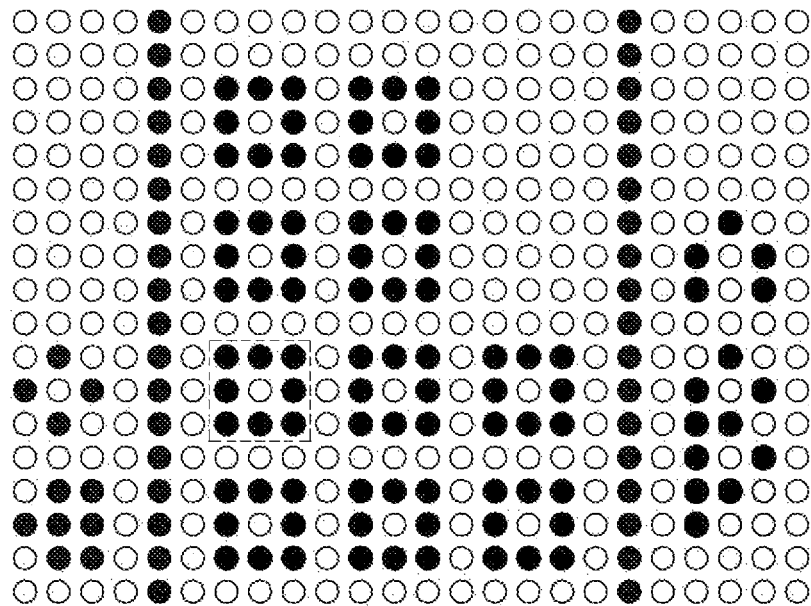
FIG. 23A

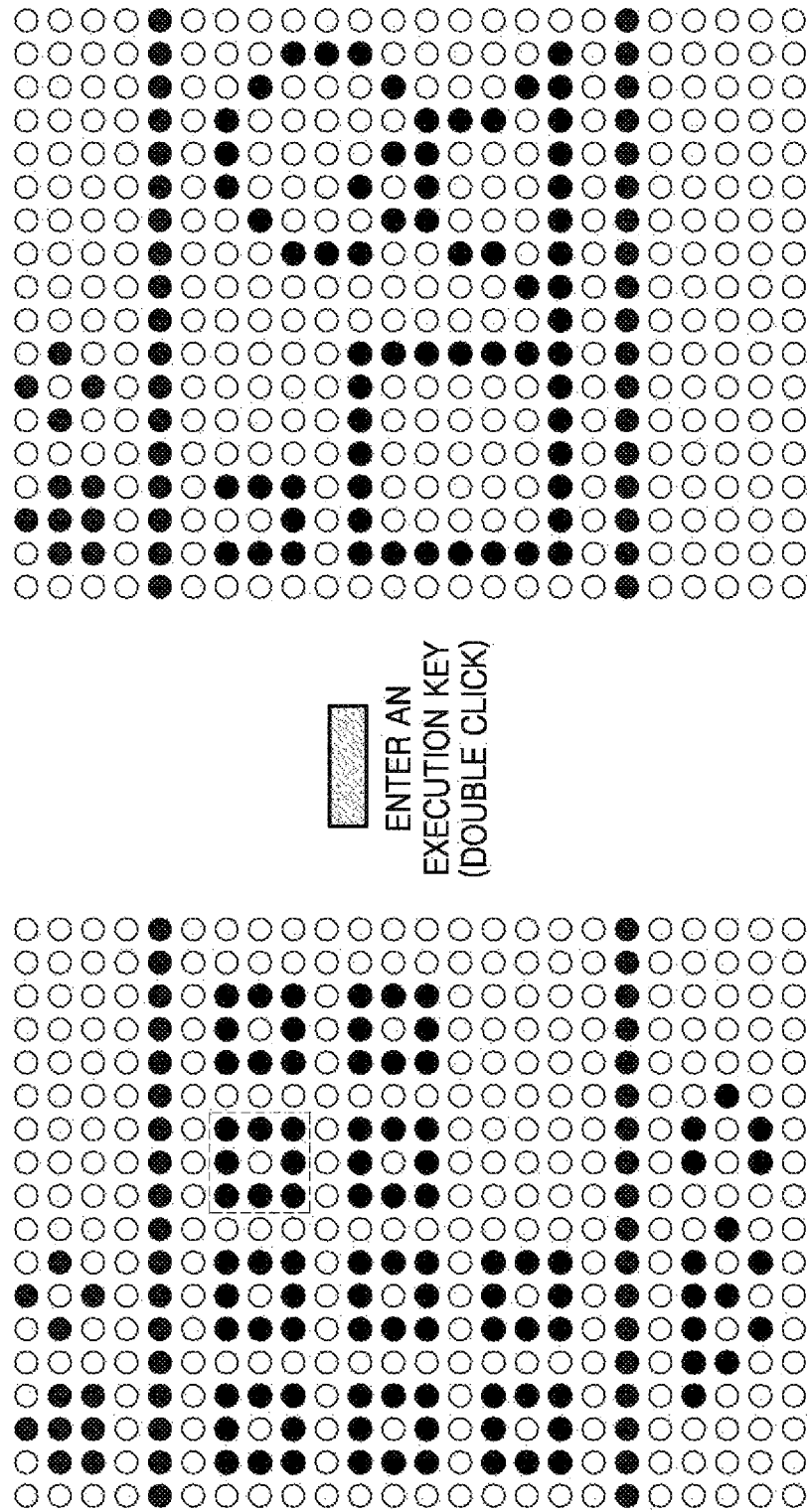

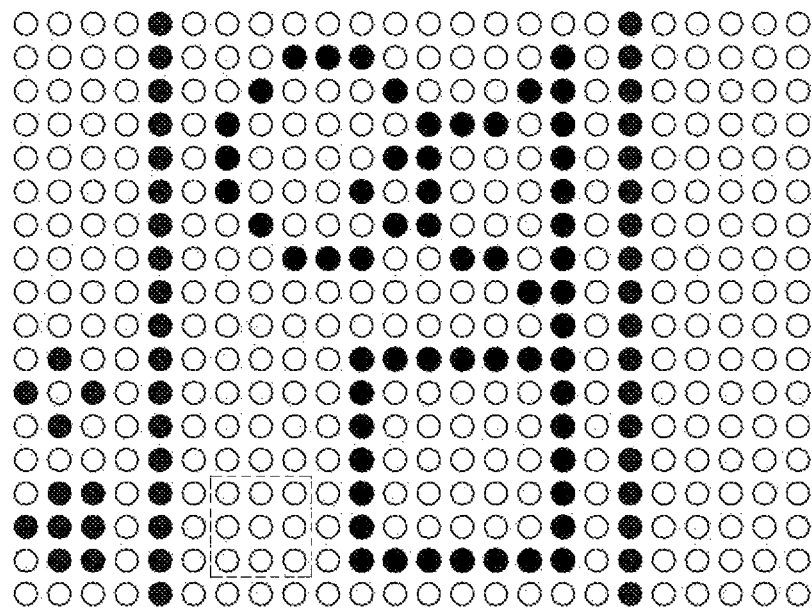
FIG. 25B
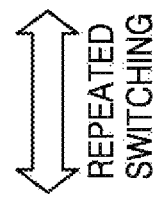
REPEATED SWITCHING
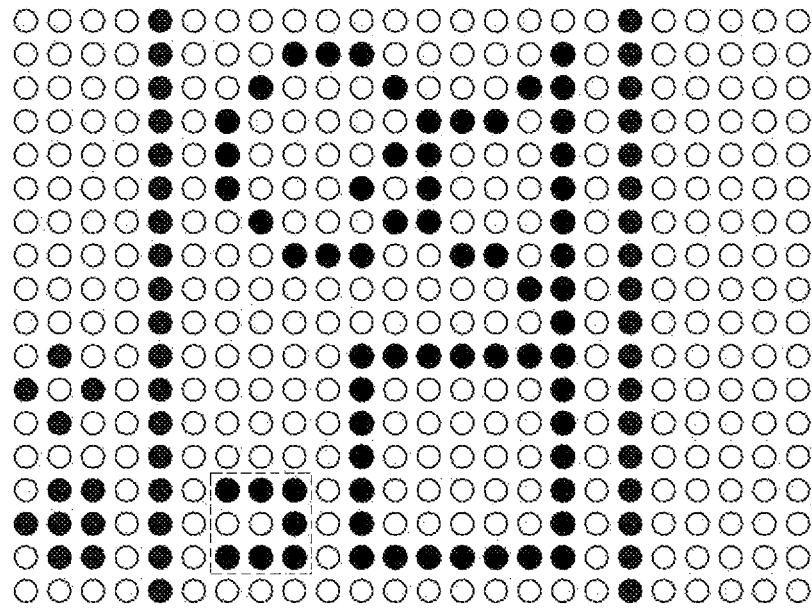
FIG. 25A

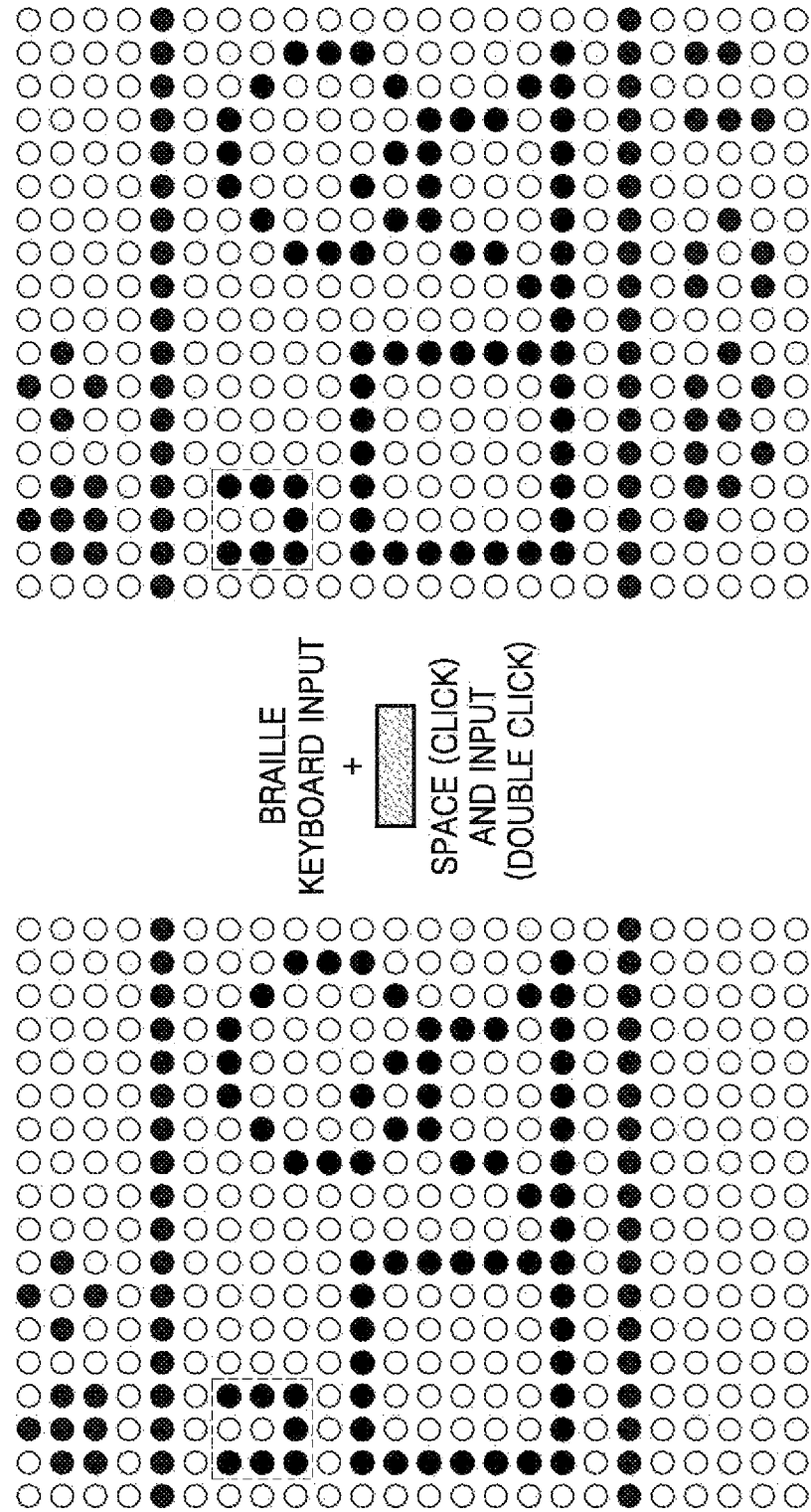

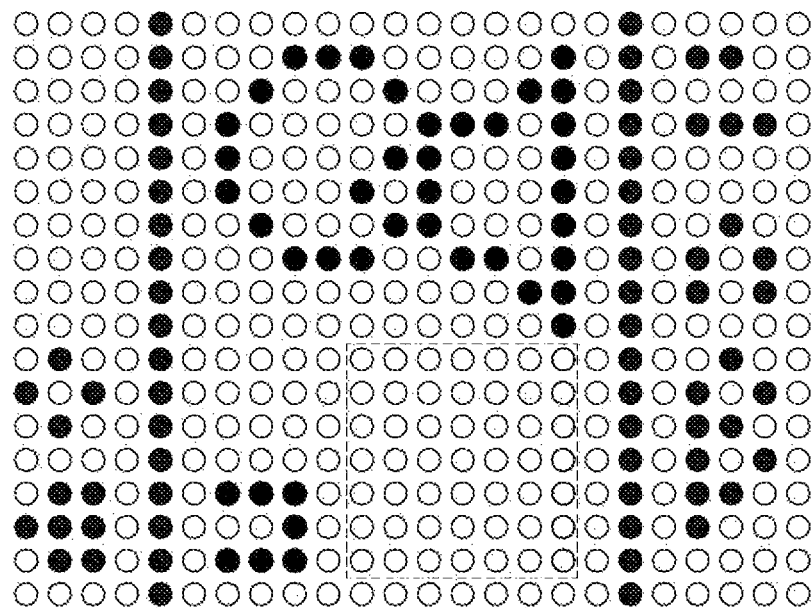
FIG. 27B
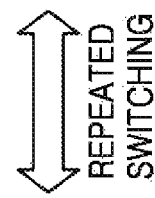
REPEATED SWITCHING
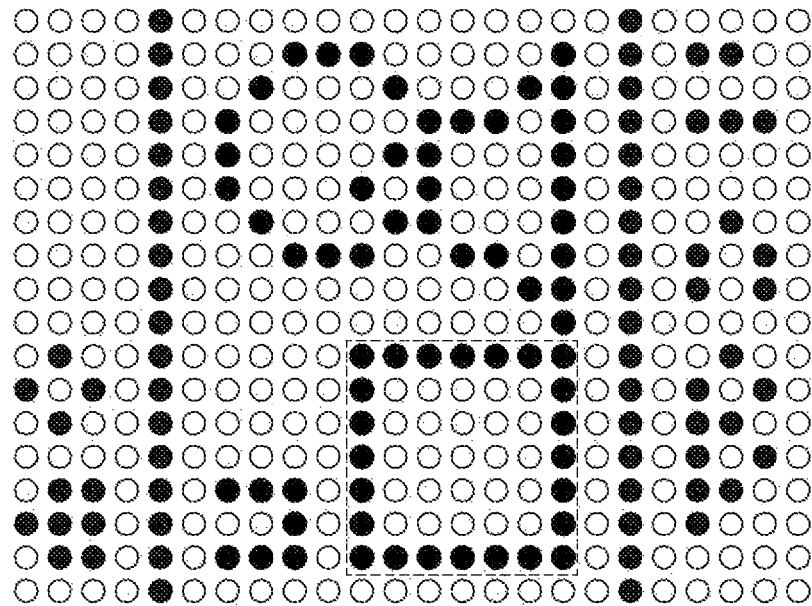
FIG. 27A

METHOD, DEVICE, AND NON-TRANSITORY COMPUTER-READABLE MEDIUM FOR CONTROLLING TACTILE INTERFACE DEVICE

CROSS-REFERENCE TO RELATED APPLICATIONS

The present application is a continuation of International Patent Application No. PCT/KR2017/001190, filed on Feb. 3, 2017, which is based upon and claims the benefit of priority to Korean Patent Application No. 10-2016-0105466, filed on Aug. 19, 2016. The disclosures of the above-listed applications are hereby incorporated by reference herein in their entirety.

TECHNICAL FIELD

The present invention relates to a method, a device, and a non-transitory computer-readable medium for controlling a tactile interface device, and more particularly, to a novel method, a device, and a non-transitory computer-readable medium for controlling a tactile interface device and enabling those visually impaired to use a tactile sense in a manner similar to that of ordinary people using a computer so as to interact with a computer more intuitively and efficiently.

BACKGROUND ART

In the information society, it is essential to acquire and utilize information by using a computer, and such a trend is the same for the visually impaired as well as ordinary people.

In order to improve the level of informatization of the visually impaired, it is necessary to enable the visually impaired to acquire and utilize information at a level similar to that of the ordinary people, which is important in that daily lives of the visually impaired can be more convenient, and the visually impaired can acquire and utilize the information for themselves. In addition, ultimately, it may be very important in that the visually impaired are provided with various educational opportunities, thereby expanding opportunities for entering and participating the society, so that their welfare can be further improved.

However, a currently general way to use the computer is mainly to visually recognize visual information outputted through a monitor, and input information for the visual information by using an input tool such as a keyboard, a mouse, or a touch pad. Accordingly, there is a huge limitation in that the visually impaired who cannot use a vision recognizes output information of the computer and have an interaction such as an instant information input at a level the same as the ordinary people. As a result, the visual impairment significantly reduces the efficiency in using the computer, thereby depriving the visually impaired of the opportunity to acquire and utilize the information through the computer.

In order to solve the difficulty in using the computer of the visually impaired, various technologies have been developed to recognize the visual information so as to interact with the computer by using hearing sense, tactile sense, or the like. As a representative technology, there is a screen reader which aids the visually impaired to use the computer through the hearing sense. The screen reader is a device or software for enabling the use of the computer by outputting, with a voice, the contents outputted on a computer screen and keyboard information inputted by the user.

However, because the screen reader searches graphical user interface (GUI) elements of the output screen by only using linearized information formed of one line without two-dimensional spatial position information with respect to the output screen, it is difficult to recognize the screen output information. In particular, the more information contained on the output screen, the greater the difficulty. In addition, because the screen reader only provides a text-based simple descriptive explanation with voice for various graphic information such as pictures and diagrams other than characters or the GUI elements, the visually impaired have big difficulty to understand and interact with the graphic information.

Another related art is a braille information terminal which delivers text information through the tactile sense by using braille cells. The braille information terminal is classified as a mode used as an independent device by providing several functions of the computer useful to the visually impaired, and a mode used as an auxiliary screen output device for outputting the text information on the computer screen analyzed by the screen reader in a braille manner. Both modes serve only as an alternate device that performs a few limited functions of the computer as a substitute for the computer, or serve only as an auxiliary output device for outputting the text information by using the braille, rather than serve as an interface for efficient interaction with the computer. In particularly, the braille information terminal specialized for outputting the braille, like the screen reader, cannot express the graphic information.

(Patent Document 1) Korean Patent Publication No. 10-2012-0063982

DISCLOSURE

Technical Problem

The present invention provides a novel method, a device, and a non-transitory computer-readable medium for controlling a tactile interface device and enabling those visually impaired to use a tactile sense in a manner similar to that of ordinary people using a computer so as to interact with the computer more intuitively and efficiently.

Technical Solution

To solve the above problem, the present invention provides a method of controlling a tactile interface device implemented by a computing device including a processor and connected to the computing device to interact with a user, in which the method includes: an input information generating step of generating input information to an application being executed in the computing device based on an input at the tactile interface device; and an output information generating step of generating output information to the tactile interface device based on an output of a focus area among outputs from the application being executed in the computing device, in which the output information includes data for implementing a tactile graphic formed of a plurality of two-dimensional tactile pixels, In the present invention, the output information to the tactile interface device may include information on a display screen displayed in the focus area, and input coordinates in the focus area.

In the present invention, the input information generating step may include an input category classifying step of classifying a category of an input from the tactile interface device; and an application input generating step of generating input information in a form that can be inputted to the application based on the input according to category of the input;

In the present invention, the category of the input includes braille information by a braille key input, input coordinate shift information by a direction key input, and instruction information by instruction key input, and the instruction information may include at least one of an execution instruction, a space instruction, and a preset shortcut instruction.

In the present invention, when the category of the input is the input coordinate shift information, the application input generating step may include a step of generating new input coordinates in the application according to the input coordinate shift information.

In the present invention, when the category of the input is the braille information, the application input generating step may include a step of generating text information inputted from input coordinates in the application may be generated according to the braille information.

In the present invention, the output information generating step may include steps of generating tactile graphic data based on the display screen displayed in the focus area in the application, and implementing the tactile graphic based on the tactile graphic data.

In the present invention, the output information generating step may include a change determining step of determining whether the display screen displayed in the focus area in the application is changed; and a tactile graphic converting step of generating tactile graphic data with respect to the display screen when the display screen is determined to be changed in the change determining step.

In the present invention, the tactile graphic converting step may include a focus partial area defining step of defining the focus area in the display screen outputted from the application into a focus partial area; and a tactile graphic element converting step of converting a display element of each focus partial area into a tactile graphic element according to a preset conversion rule.

In the present invention, the tactile graphic may include a plurality of layers, and at least one of the layers may include a tactile icon corresponding to an icon of executing an instruction for changing the display screen of the focus area among the outputs from the application.

In the present invention, the tactile graphic may include a plurality of layers, and the focus partial area may correspond to the layers.

In the present invention, the output information generating step may include a tactile graphic generating step of generating tactile graphic data based on the display screen displayed in the focus area of the application and the input coordinates in the focus area, in which the tactile graphic may be implemented based on the tactile graphic data.

In the present invention, the tactile graphic data may include a tactile graphic element converted from the display element of the display screen according to the preset conversion rule, and data for implementing the graphic of the display screen or a graphic element formed by simplifying the graphic, in which the input coordinates may correspond to positions of the tactile graphic elements or the graphic elements.

In the present invention, the output information generating step may include a step of generating braille information expressed in the tactile interface device by a tactile pixel or sound information reproduced in the tactile interface device by the tactile interface device, based on detailed information of the tactile graphic element corresponding to the input coordinates, in which the output information to the tactile interface device may include the braille information or the sound information.

In the present invention, when the input coordinates are arranged in the tactile graphic element or the graphic element, the tactile graphic generating step may include a step of generating tactile graphic data for upwardly and downwardly moving at least one of the tactile pixels of a detailed area of the tactile graphic corresponding to the tactile graphic element or the graphic element.

Advantageous Effects

According to an embodiment of the present invention, tactilely displayed articles can be intuitively perceived by the visually impaired in real time.

According to an embodiment of the present invention, the visually impaired can efficiently perform the input while perceiving information in a tactile manner and depending on the perceived information.

According to an embodiment of the present invention, the visually impaired can recognize the screen output information of the computer in the form of braille, voice and tactile graphics and instantly and intuitively input information, thereby efficiently using the computer in a way very similar to the ordinary people.

According to an embodiment of the present invention, various functions of an operating system (OS) and various application software can be easily expanded for use.

According to an embodiment of the present invention, the remarkably improved operation performance speed and the convenience can be provided to a visually impaired person compared to the conventional device such as a screen reader.

According to an embodiment of the present invention, the computer literacy ability of the visually impaired can be remarkably improved, and the market of computer hardware and software for the visually impaired can be expanded.

DESCRIPTION OF DRAWINGS

FIG. 16 is a schematic view illustrating a table of tactile icons according to an embodiment of the present invention.

FIGS. 21A to 27B are views illustrating outputs of a tactile interface device based on an operation of a user according to an embodiment of the present invention.

BEST MODE

Mode for Invention

Figure 1:
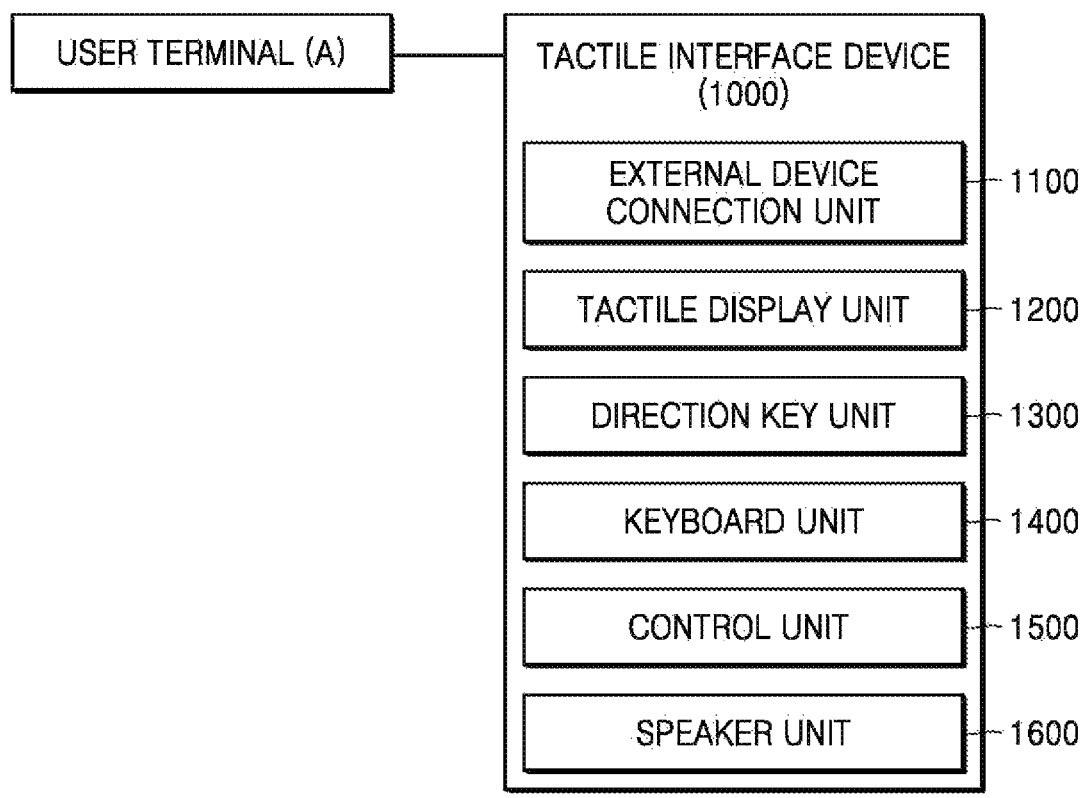
FIG. 1 is a schematic view illustrating an internal structure of a tactile interface device and a user terminal according to an embodiment of the present invention.

The aspects, features and advantages of the present application will be understood with reference to the following embodiments and the accompanying drawings. Same reference numerals in different drawings may indicate the same or similar elements. In addition, the following description is not intended to limit the invention, and the scope of the present invention will be defined by the appended claims and their equivalents.

Tactile Interface Device

Hereinafter, an example of a tactile interface device to be controlled in a method, a device, and a non-transitory computer-readable medium for controlling a tactile interface device according to the present invention will be described.

FIG. 1 is a schematic view illustrating an internal structure of a tactile interface device 1000 and a user terminal according to an embodiment of the present invention.

As shown in FIG. 1, the tactile interface device 1000 is configured to be connected to a user terminal A in a wired or wireless manner so as to transmit and receive data. For example, the tactile interface device 1000 may receive a graphic signal from the user terminal A to provide tactile information.

However, according to the present invention, unlike FIG. 1, the tactile interface device 1000 itself may be operated by an independent operating system without an external user terminal, and the tactile interface device 1000 may be operated by an operation based on a program and an internal memory inside the tactile interface device 1000. However, even in this case, the tactile interface device 1000 may be provided with a communication function.

Meanwhile, the user terminal A may be a computing device such as a smart phone, a tablet, a personal computer (hereinafter referred to as "PC"), a mobile phone, a videophone, an e-book reader, a desktop PC, a laptop PC, a netbook PC, a personal digital assistant (hereinafter referred to as "PDA"), a portable multimedia player (hereinafter referred to as "PMP"), an mp3 player, a portable medical device, a camera, a wearable device such as a head-mounted device (hereinafter referred to as "HMD"), an electronic garment, an electronic bracelet, an electronic necklace, an electronic appccessory, an electronic tattoo, and a smart watch.

Figure 3:
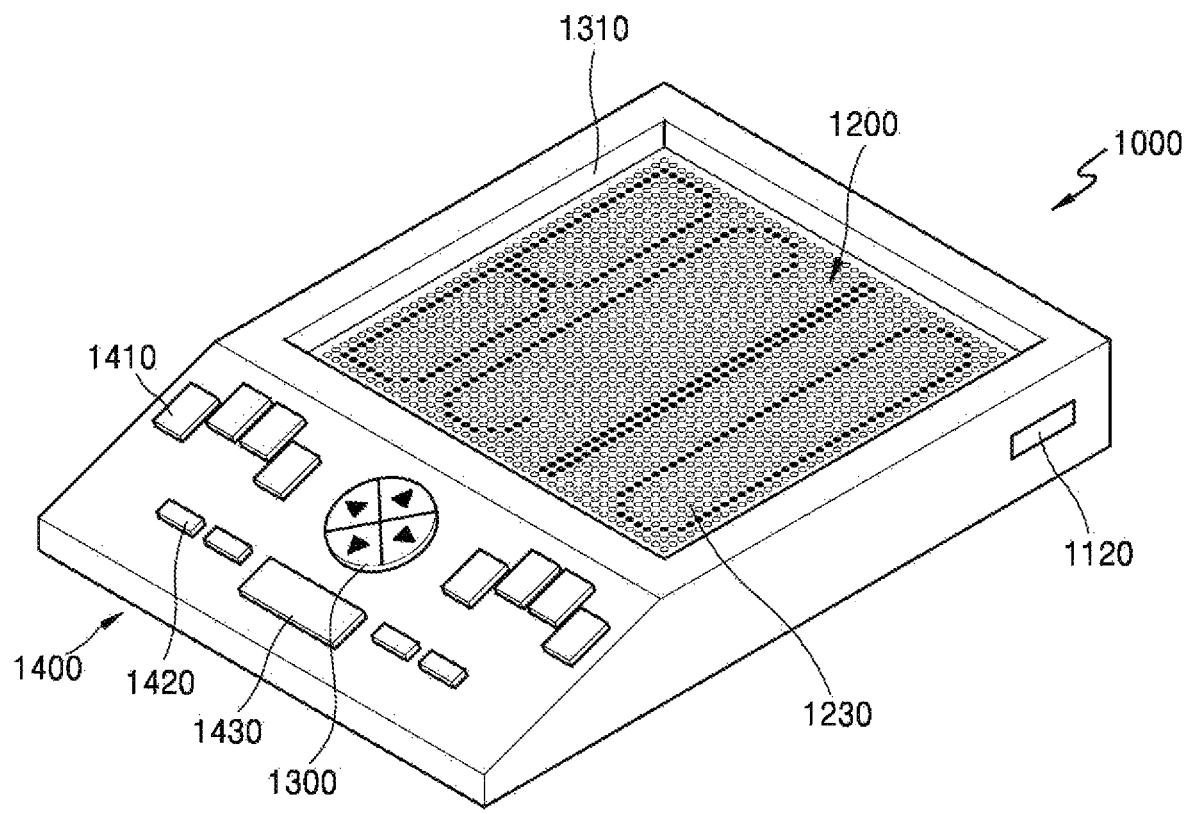
FIG. 3 is a perspective view illustrating a tactile interface device according to an embodiment of the present invention.

As shown in FIG. 1 or FIG. 3, the tactile interface device 1000 according to an embodiment of the present invention includes an external device connection unit 1100, a tactile display unit 1200, a direction key unit 1300, a keyboard unit 1400, a control unit 1500, and a speaker unit 1600. The tactile display unit 1200 converts a visual graphic outputted from a monitor by a computer into a tactile graphic and outputs the converted tactile graphic.

Meanwhile, the user performs an input to the tactile interface device through the direction key unit 1300 and the keyboard unit 1400, and the tactile interface device converts the instruction or information inputted in the above manner, and transmits the instruction or information to the user terminal A.

Preferably, the keyboard unit 1400 may include a braille keyboard for transmitting a character input signal to the computer by converting braille characters commonly used by the visually impaired into ordinary characters.

The keyboard unit 1400 receives the braille and transmits the braille to the tactile interface device 1000 or the user terminal connected to the tactile interface device 1000. Preferably, the keyboard unit 1400 may include a braille key 1410, a shortcut key 1420, and an execution or space key 1430. Because the braille is formed of several dots to form a single letter, the braille keyboard can transmit information on simultaneously pressed buttons. The transmitted braille information is braille-translated into the general character through software inside the tactile interface device 1000 or software in the user terminal.

Accordingly, for the purpose of a computer input/output function for the visually impaired, the tactile display unit 1200 serves the same role as a monitor of a general computer, and the direction key unit 1300 and the keyboard unit 1400 serve as input devices such as a keyboard and a mouse of the general computer.

Figure 2:
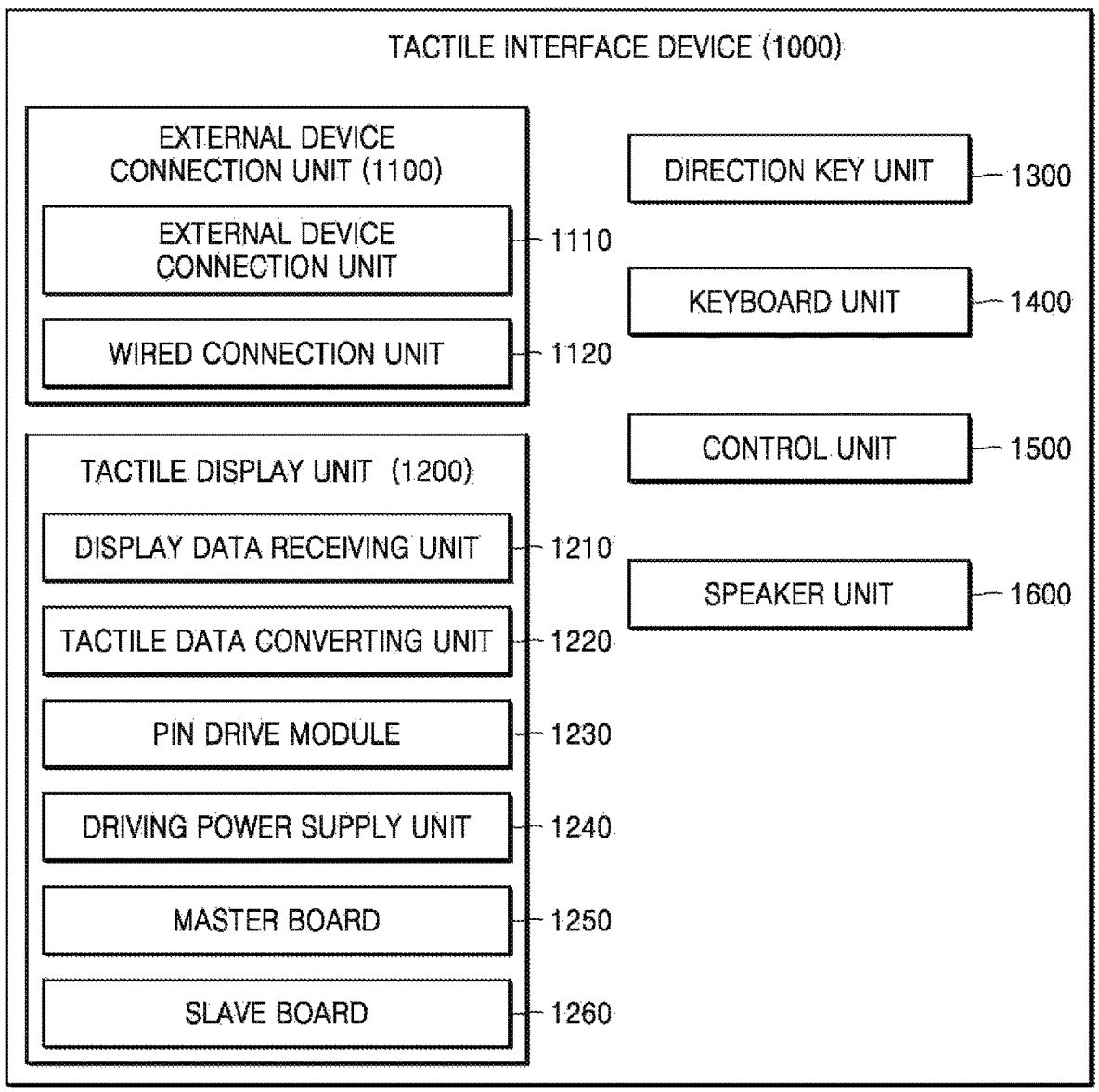
FIG. 2 is a schematic view illustrating an internal structure of a tactile interface device according to an embodiment of the present invention.

FIG. 2 is a schematic view illustrating an internal structure of a tactile interface device 1000 according to an embodiment of the present invention.

The tactile interface device 1000 according to an embodiment of the present invention includes: a tactile display unit 1200 for providing tactile information to the user through a plurality of pins based on data received from a connected external device or data generated in the tactile interface device 1000; a direction key unit 1300 for changing input coordinates or a position of a specifically focused item; an external device connection unit 1100 connected to an external device; a keyboard unit 1400 for receiving information from the user in the form of a key input; a speaker unit 1600 for outputting sounds to the outside; and a control unit 1500 for controlling operations of the tactile display unit 1200, the direction key unit 1300, the external device connection unit 1100, the keyboard unit 1400, and the speaker unit 1600.

The tactile display unit 1200 may provide the tactile information by using a tactile pixel having at least one dimension, and the tactile pixel may include a plurality of pins moved up and down by applying power to a transducer including a piezoelectric ceramic and an elastic body. Preferably, the tactile pixel provides the tactile information in two dimensions.

The above tactile display unit 1200 includes: a display data receiving unit 1210 for depending on data received from the external user terminal, or receiving data generated in the tactile interface device 1000; a tactile data converting unit 1220 for converting the data into tactile display data; a plurality of pin drive modules 1230 driven by the tactile display data; and a driving power supply unit 1240 for receiving power for driving the tactile display unit 1200, in which the tactile display unit 1200 provides the tactile information or the tactile graphic based on the received data.

Meanwhile, the direction key unit 1300 changes input coordinates or a position of a specifically focused item;

The external device connection unit 1100 includes at least one of a communication module unit 1110 for performing wireless communication and a wired connection unit 1120 wiredly accessed to the external device. The communication module unit 1110 includes at least one of a bluetooth communication module, a zigbee communication module, an infrared communication module, a bluetooth low energy (BLE) communication module, an audio communication module, a long term evolution (LTE) communication module, a WiFi communication module, an IrDA-based infrared communication module, a wireless LAN (WLAN), a WiBro module, and a wireless USB module. Meanwhile, preferably, the wired connection unit 1120 may include a connection module using a universal serial bus (USB) interface, as well as a wired connection module capable of transmitting and receiving data.

Meanwhile, the speaker unit 1600 may perform, with voice, a function of reading out information outputted in response to information tactilely displayed on the tactile interface device 1000, character information, or information inputted by the direction key unit 1300.

The control unit 1500 controls overall operations of the tactile interface device, or operations of the external device connection unit 1100, the keyboard unit 1400, or the speaker unit 1600. For example, when data is received from the external user terminal, the data is transmitted to the display data receiving unit 1210 of the tactile display unit 1200, and an operation of the tactile display unit 1200 is instructed. Alternatively, when an input of the use is inputted from the direction key unit 1300, the input is processed by the control unit 1500 or an input signal is transmitted to the user terminal A connected through the external device connection unit 1100.

When being operated by its own OS and application other than the connection with the external user terminal, the tactile display device may include a CPU and a memory device at a level of being capable of its own operation and operate independently. Even though being operable independently, the tactile display device also may perform communication with the outside.

FIG. 3 is a perspective view illustrating a tactile interface device 1000 according to an embodiment of the present invention.

As shown in FIG. 3, the tactile interface device 1000 according to the present invention provides a tactile display in a pixel type by using components of the tactile display unit 1200 exposed to the outside, in particular, by the pin drive modules 1230. The user may tactilely recognize the pin drive modules 1230 of the tactile display unit 1200 by the above tactile display unit 1200.

Meanwhile, the user may input information into the tactile interface device 1000 through the keyboard unit 1400 so as to input specific information, for example, to input text information.

In addition, the tactile interface device 1000 may output voice information to the user through the speaker unit 1600 to output voice or sound information of the text to the user.

As shown in FIG. 3, the tactile interface device 1000 may be connected to the external user terminal through the wired connection unit 1120, or connected to the external user terminal through the communication module unit 1110 by using the wireless communication. In the above case, the GUI elements in the user terminal may be tactilely displayed on the tactile interface device 1000, and the user may input a response or input with respect to the GUI elements through the direction key unit 1300 or the keyboard unit 1400. In addition, the tactile display device 1000 displays the input coordinates changed in the tactile display unit 1200 according to an input coordinate change instruction inputted by the user through the direction key unit 1300, such that the visually impaired may use a user terminal such as a graphic screen-based PC more intuitively.

In addition, the above tactile interface device 1000 can enable the visually impaired not only to simply recognize the tactile information, but also to recognize the tactile information and therefore perform an input such as an instruction to the tactile interface device 1000, such that, as a result, the user terminal such as the graphic screen-based PC can be used conveniently as same with the ordinary people.

Figure 4:
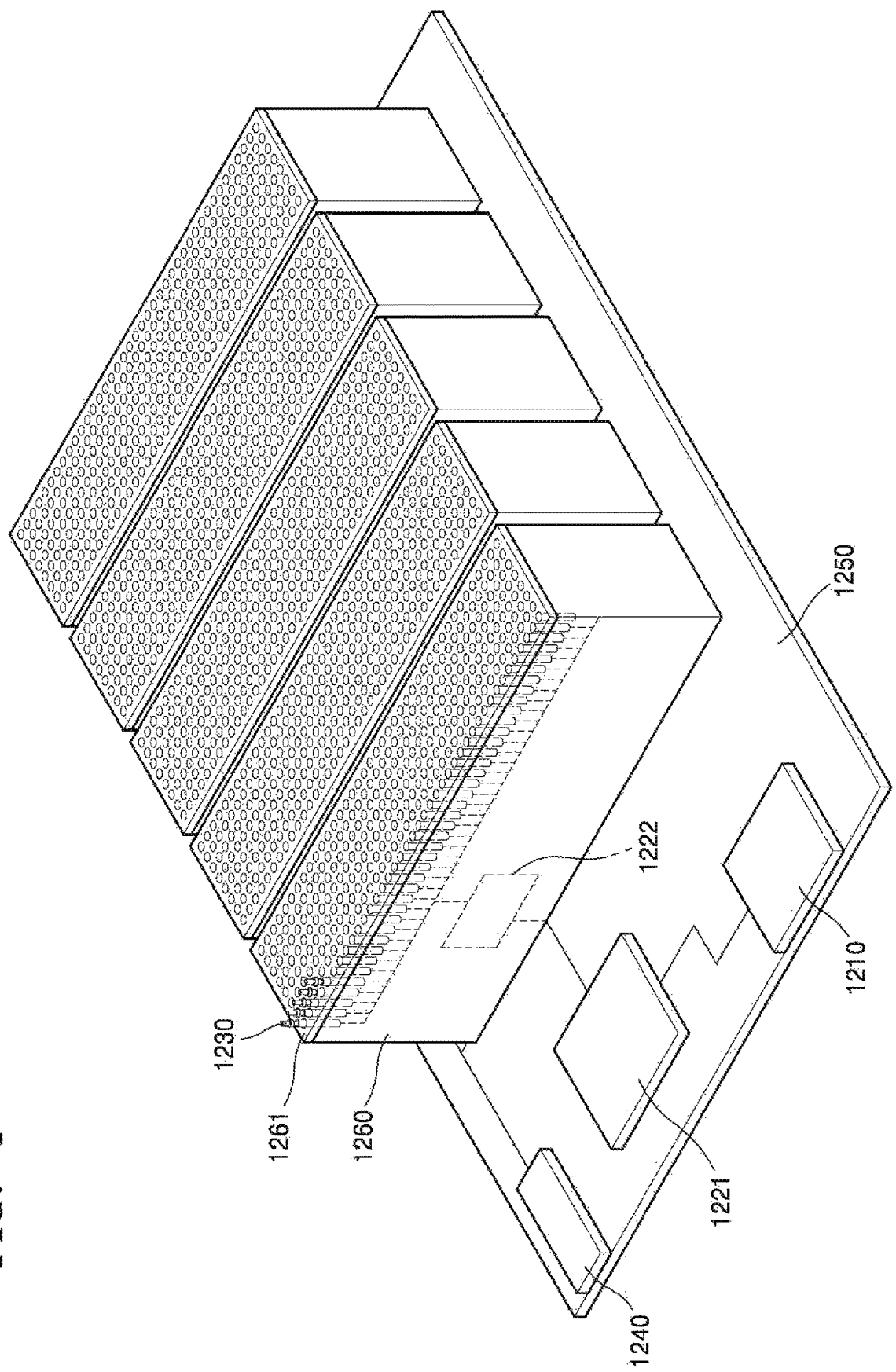
FIG. 4 is a perspective view illustrating a tactile display unit according to an embodiment of the present invention.

FIG. 4 is a perspective view illustrating a tactile display unit 1200 according to an embodiment of the present invention.

The tactile display unit 1200 may display or provide tactile pixels having at least one dimension. FIG. 4 shows an example of a tactile display unit 1200 capable of providing two-dimensional tactile pixels. The tactile pixels includes a plurality of pins moved up and down by applying power to a transducer including a piezoelectric ceramic and an elastic body.

Specifically, the tactile pixels are displayed by a plurality of pin drive module groups, and each of the pin driving module groups includes a plurality of pin drive modules 1230. Alternatively, the entire pin drive modules may constitute one pin drive module group.

Specifically, the tactile display unit 1200 includes a master board 1250; a display data receiving unit 1210 electrically connected to the master board 1250 to receive primary data for the tactile display; a tactile data converting unit 1220 for converting the primary data received from the display data receiving unit 1210 into data for the tactile display; a plurality of slave boards 1260 electrically connected to the master board 1250; a plurality of pin drive modules 1230 disposed on outer surfaces of the slave boards 1260; and a driving power supply unit 1240 for supplying driving power to the above components through the master board 1250.

Preferably, the driving power supply unit 1240 may be configured to provide power supplied from the outside to the master board 1250.

Meanwhile, the tactile data converting unit 1220 includes a first tactile data converting unit 1221 disposed on the master board 1250 and a second tactile data converting unit 1222 disposed on the slave board 1260, wherein the first tactile data converting unit 1221 converts the primary data into secondary data as tactile data for each of the slave boards 1260, and the second tactile data converting unit 1222 converts the secondary data into tertiary data for driving a group of the pin drive modules 1230 disposed in each of the slave boards 1260.

The tactile display unit 1200 is a device for converting a visual graphic into a tactile graphic form through up/down movements of multiple-arrayed pins of the drive module 1230. The tactile display unit 1200 according to the present invention may be miniaturized and have a structure for easily implementing the multiple array, because the configuration for an additional module is unnecessary compared to a relay mechanism by piezoelectric bimorph having a structure in which the pin moves up when a voltage is applied and the pin moves down when the voltage is not applied.

Accordingly, the tactile display unit 1200 according to the present invention can provide a high-resolution tactile display while implementing the miniaturization of the device.

The master board 1250 receives the tactile graphic data inputted through the display data receiving unit 1210 and transmits the tactile graphic data to the first tactile data converting unit 1221. Preferably, the display data receiving unit 1210 may be a universal asynchronous receiver/transmitter (UART), and the first tactile data converting unit 1221 may be a micro controller unit (MCU).

Preferably, the first tactile data converting unit 1221 may analyze the tactile graphic data inputted through the display data receiving unit 1210 and transmit the tactile graphic data to the slave boards 1260. In the above transmission, preferably, the first tactile data converting unit 1221 may convert the data based on information of the slave boards 1260 and then transmit the converted data to the slave boards 1260.

Alternatively, the first tactile data converting unit 1221 may convert the tactile graphic data into data corresponding to each of the slave boards 1260, and the converted data may be transmitted to the slave boards 1260, respectively.

Alternatively, the tactile graphic data transmitted through the display data receiving unit 1210 may be directly transmitted to the slave board 1260 without the first tactile data converting unit 1221.

Then, the second tactile data converting unit 1222 embedded in the slave board 1260 uses a complex programmable logic device (CPLD) which is previously programmed, thus data transmitted from the first tactile data converting unit 1221 or transmitted through the display data receiving unit 1210 is separated in accordance with the pin drive module 1230 or a pin drive module array including the pin drive modules 1230, and an operation signal is transmitted to the pin drive module 1230 or the pin drive module array including the pin drive modules 1230.

According to the operation signal, the pin of the pin drive module 1230 may move up and down, and preferably, a gap and an elevation height of the pin may be in the range of 1 mm to 10 mm.

FIGS. 5A, 5B, 5C and 5D are views illustrating examples of a pin drive module according to an embodiment of the present invention.

Hereinafter, embodiments of pin drive modules 1230 shown in FIGS. 5A and 5B will be described.

Figure 5A:
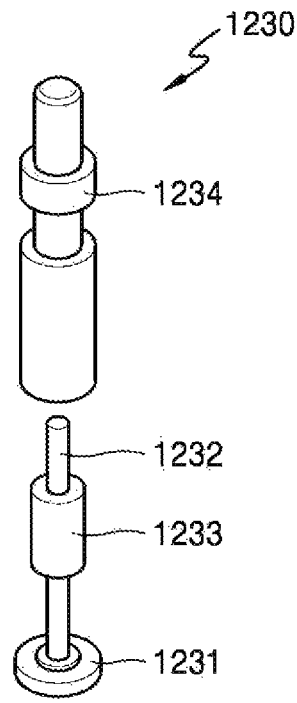
FIGS. 5A, 5B, 5C, and 5D are exemplary views illustrating pin drive modules according to an embodiment of the present invention.
Figure 5B:
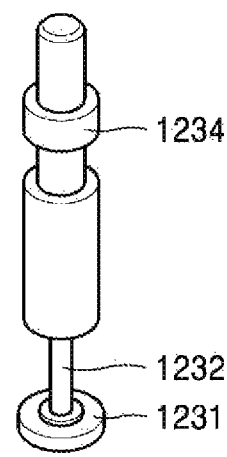

As shown in FIG. 5A, the pin drive module 1230 includes a transducer 1231 for converting an oscillating motion into a linear motion; a shaft 1232 connected to the transducer; a moving body 1233 that moves up and down on the shaft 1232 in the axial direction of the shaft 1232; and a pin 1234 that moves according to the movement of the moving body 1233.

Preferably, the transducer 1231 may include a plurality of piezoelectric ceramics and elastic bodies, and when power is applied, the transducer 1231 may convert a vibration caused by expansion/contraction of the piezoelectric ceramics into a linear state so as to move the moving body 1233 up and down, and may control the transducer so as to control the movement of the moving body 1233.

Hereinafter, embodiments of the pin drive module 1230 shown in FIGS. 5C and 5D will be described.

Figure 5C:
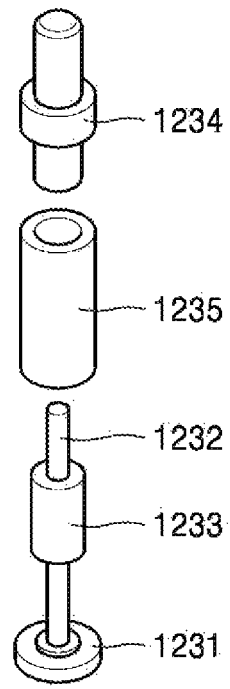
Figure 5D:
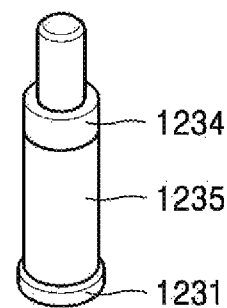

As shown in FIG. 5C, the pin drive module 1230 include a transducer 1231 for converting an oscillating motion into a linear motion; a shaft 1232 connected to the transducer; a moving body 1233 that moves up and down on the shaft 1232 in the axial direction of the shaft 1232; a pin 1234 that moves according to a movement of the moving body 1233; and a casing unit 1235 which surrounds the shaft 1232 and into which one end of the pin 1234 is inserted.

Preferably, the transducer 1231 may include a plurality of piezoelectric ceramics and elastic bodies, and when power is applied, the transducer 1231 may convert a vibration caused by expansion/contraction of the piezoelectric ceramics into a linear state so as to move the moving body 1233 up and down, and may control the transducer so as to control the movement of the moving body 1233.

Figure 6:
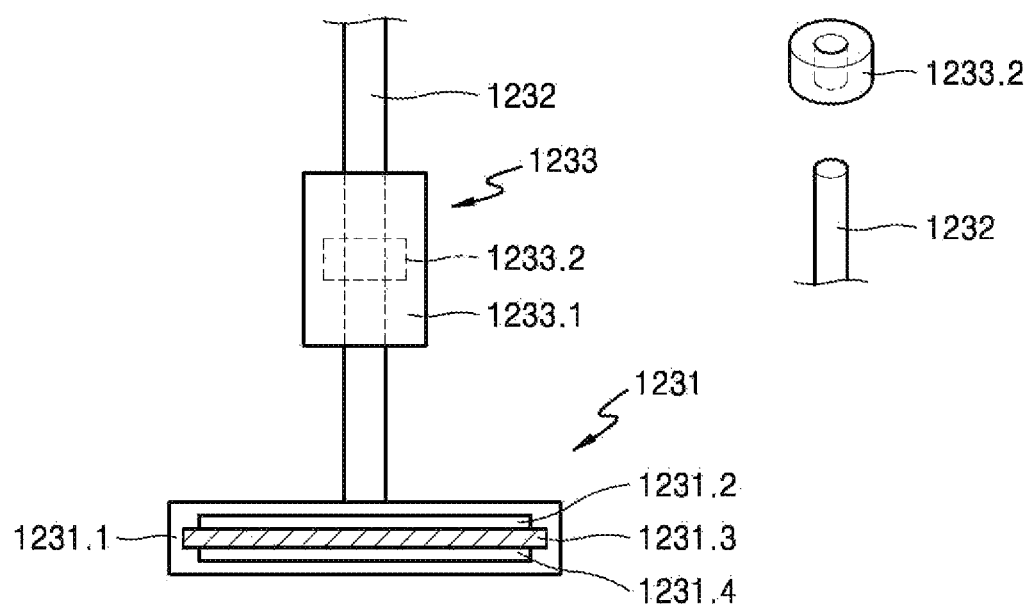
FIG. 6 is a sectional view illustrating a pin drive module according to an embodiment of the present invention.

FIG. 6 is a sectional view illustrating a pin drive module according to an embodiment of the present invention.

As shown in FIG. 6, the transducer 1231 of the pin drive module 1230 includes a housing 1231.1; a first piezoelectric ceramic 1231.2 and a second piezoelectric ceramic 1231.4 disposed inside the housing 1231.1; and an elastic member 1231.3 disposed between the first piezoelectric ceramic and the second piezoelectric ceramic.

Meanwhile, the moving body 1233 includes a moving main body 1233.1 and a rubber ring 1233.2 disposed inside the moving main body 1233.1.

In the above structure, a voltage applied to the first piezoelectric ceramic 1231.2 and the second piezoelectric ceramic 1231.4 of the transducer 1231 is controlled, so that the up/down movement of the moving body 1233 can be efficiently controlled.

Figure 7:
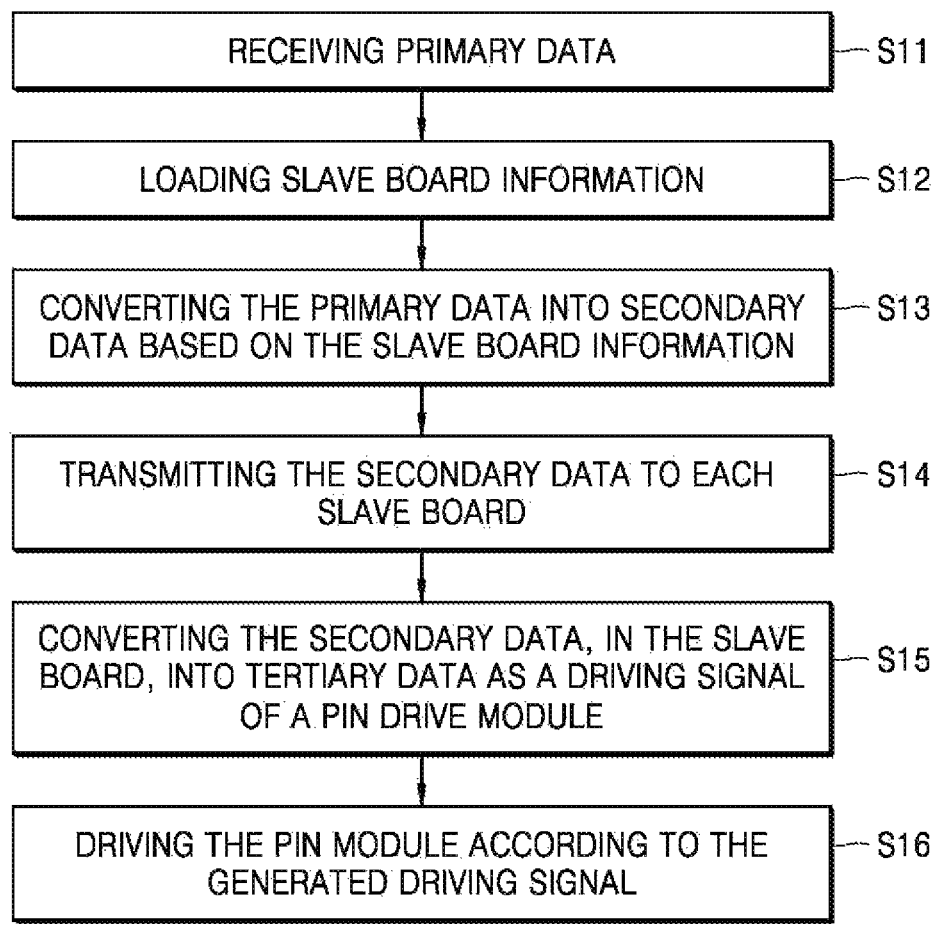
FIG. 7 is a schematic view illustrating sub-steps of a tactile display step according to an embodiment of the present invention.

FIG. 7 is a schematic view illustrating sub-steps of a tactile display step according to an embodiment of the present invention.

In the tactile display step S10, the tactile information is provided by the tactile pixel displayed through a plurality of pins moved up and down by applying power to the transducer including the piezoelectric ceramic and the elastic body.

Specifically, the tactile display step includes: a primary data receiving step S11 of receiving primary data transmitted from the connected external device or primary data generated in the tactile interface device 1000;

a slave board information loading step S12 for loading information on the slave board 1260 such as the number of slave boards 1260, and the number of tactile pixels that can be expressed by each of the slave boards 1260;

a secondary data converting step S13 of converting the primary data into secondary data according to the loaded information on the slave board 1260;

a slave board transmitting step S14 of transmitting the converted secondary data to each of the slave boards 1260;

a tertiary data converting step S15 of converting the secondary data into tertiary data as a driving signal of the pin drive module 1230 or the pin drive module array including the pin drive modules 1230; and a pin driving step S16 for driving each of the pin driving modules 1230 by using the generated driving signal.

In the tactile display step, the visual graphic is converted and transmitted into the tactile graphic form through the up/down movement of the multiple-arrayed pins of the pin drive module 1230. In the tactile display step as in the present invention, a structure for miniaturization and for easy multiple array may be implemented because the configuration for an additional module is unnecessary compared to a relay mechanism by piezoelectric bimorph having a structure in which the pin moves up when a voltage is applied and the pin moves down when the voltage is not applied.

Accordingly, the tactile display step as in the present invention can provide a high-resolution tactile display while implementing the miniaturization of the device.

Preferably, the primary data receiving step S11 may be performed in the master board 1250, receive tactile graphic data inputted from the outside, and be performed through the universal asynchronous receiver/transmitter (UART) module.

Meanwhile, preferably, the slave board information loading step S12 and the secondary data converting step S13 may be performed by the micro controller unit (MCU) electrically connected to the master board 1250.

Preferably, in the secondary data converting step S13, the tactile graphic data inputted through the primary data receiving step S11 is analyzed.

Thereafter, in the slave board transmitting step S14, the analyzed tactile graphic data may be transmitted to the slave board 1260.

Preferably, in the above secondary data converting step S13 and the slave board transmitting step S14, the data may be converted based on information of the slave boards 1260, and then transmitted to the slave boards 1260.

Alternatively, in the secondary data converting step S13, the tactile graphic data may be converted into data corresponding to each of the slave boards 1260, and the converted data may be transmitted to the slave boards 1260, respectively.

Alternatively, without the secondary data converting step S13, the tactile graphic data transmitted through the primary data receiving step S11 may be directly transmitted to the slave board 1260.

Then, the tertiary data converting step S15 is performed by a processing unit embedded in the slave board 1260. In the third data converting step, through data received by using a previously programmed complex programmable logic device (CPLD), the received data is separated according to the pin drive module 1230 or the pin drive module array including the pin drive modules 1230, and an operation signal is transmitted to the pin drive module 1230 or the pin drive module array including the pin drive modules 1230.

Preferably, the slave boards 1260 may be disposed on a single master board 1250, and electrically connected to the master board 1250.

The above-mentioned tactile interface device is described as a tactile interface device to be used as an example in the method, the device, and the non-transitory computer-readable medium for controlling the tactile interface device which are described as below. The description of the method, the device, and the non-transitory computer-readable medium for controlling the tactile interface device is not limited to the above-mentioned description, and should be understood in the broadest meaning according to the claims of the invention.

A Method, a Device, and a Non-Transitory Computer-Readable Medium for Controlling a Tactile Interface Device Hereinafter, the method, the device, and the non-transitory computer-readable medium for controlling the tactile interface device according to the present invention will be described.

Figure 8:
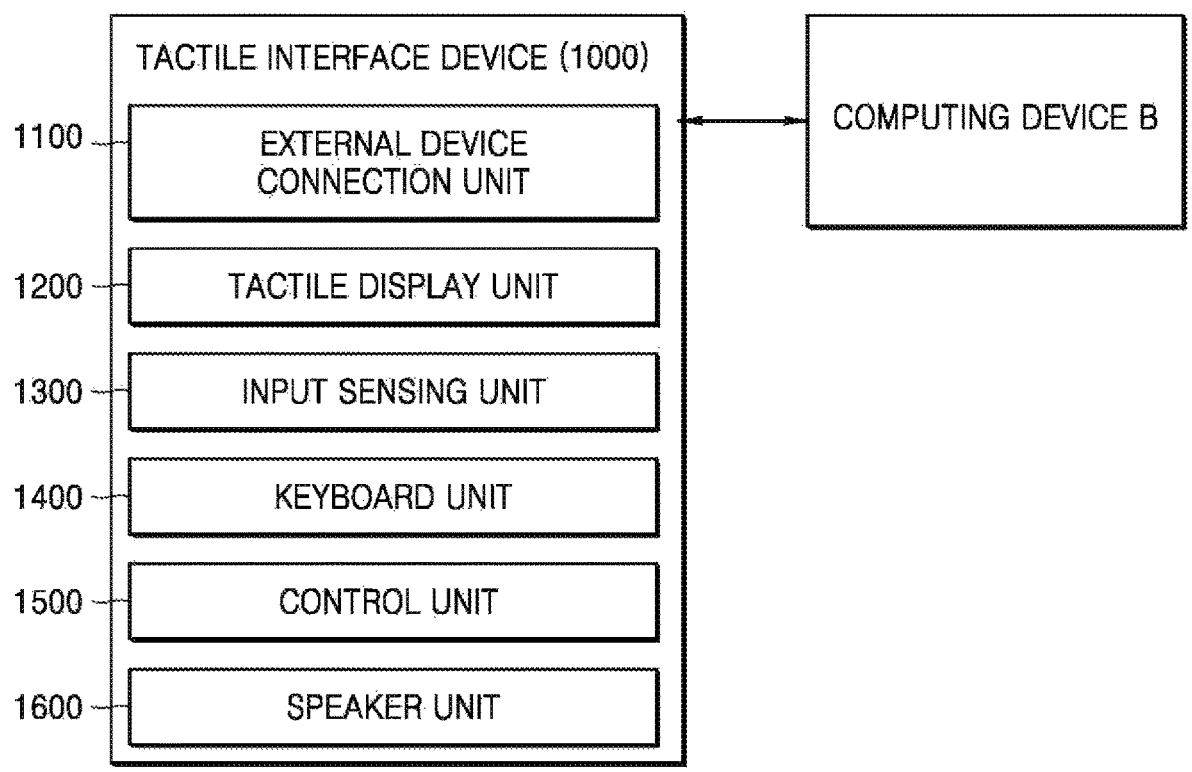
FIG. 8 is a schematic view illustrating a configuration of a tactile interface device and a computing device for controlling the tactile interface device according to an embodiment of the present invention.

FIG. 8 is a schematic view illustrating a configuration of a tactile interface device and a computing device for controlling the tactile interface device according to an embodiment of the present invention.

Figure 13:
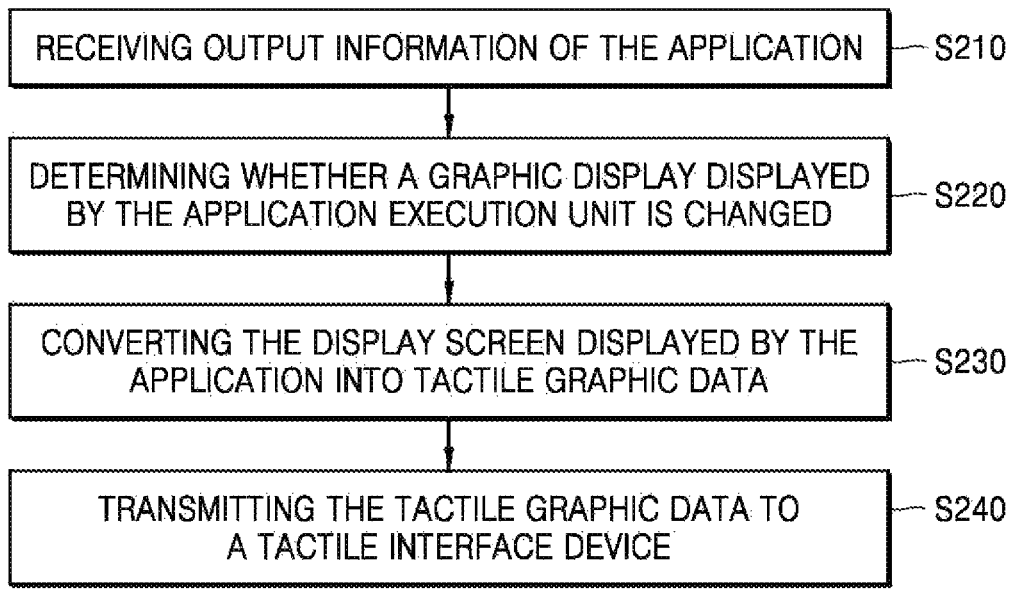
FIG. 13 is a schematic view illustrating processes of an output information generating step according to an embodiment of the present invention.

Although FIG. 13 shows that the tactile interface device 1000 connected to a computing device B has components the same as the tactile interface device, this is just one example, and the present invention is not limited thereto. The tactile interface device connected to the computing device B for controlling the tactile interface device according to the present invention, which is described hereinafter, includes all of any interface device capable of providing the tactile graphic, the tactile interface device capable of interacting with the user, and the computing device B capable of outputting the tactile graphic.

As shown in FIG. 8, the computing device B is connected to the tactile interface device, and the above a connection includes both a wired connection and a wireless connection.

The computing device B may correspond to the above-described user terminal A shown in FIG. 1. The computing device B may include a smart phone, a tablet, a personal computer (hereinafter referred to as "PC"), a mobile phone, a videophone, an e-book reader, a desktop PC, a laptop PC, a netbook PC, a personal digital assistant (hereinafter referred to as "PDA"), a portable multimedia player (hereinafter referred to as "PMP"), an mp3 player, a portable medical device, a camera, a wearable device such as a head-mounted device (hereinafter referred to as "HMD"), an electronic garment, an electronic bracelet, an electronic necklace, an electronic appcessory, an electronic tattoo, a smart watch, or the like.

The above computing device B may include at least one processor and memory, and may be selectively connected to a display device such as a monitor or provided therein with a display module.

Alternatively, the computing device B may be in a form combined to the tactile interface device. In the above case, the tactile interface device and the computing device B for controlling the tactile interface device may be recognized as a single device from the viewpoint of the user. In the case of the above combined type device, the computing device B and the tactile interface device may be in the form of sharing the processor and the memory.

Figure 9:
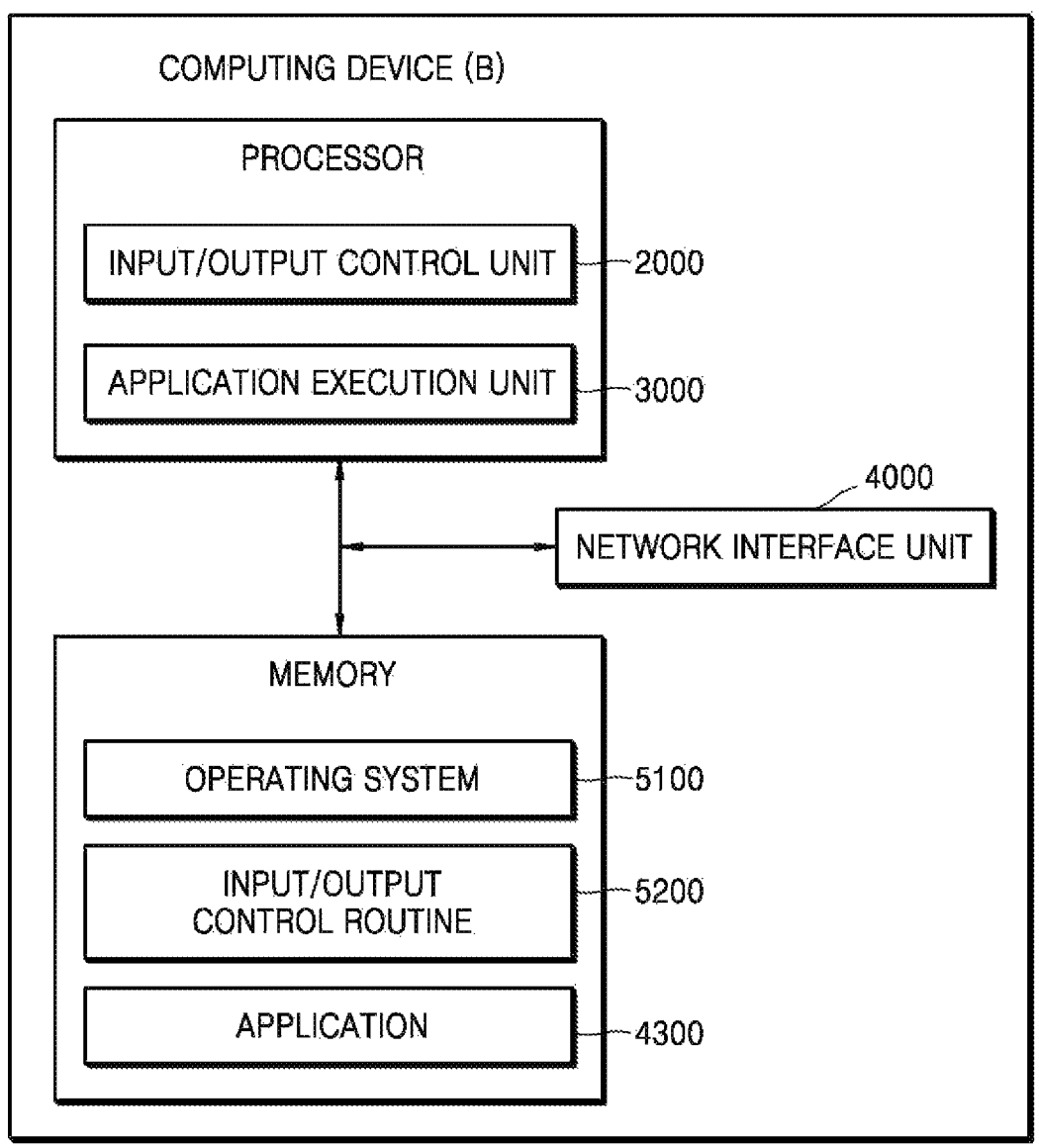
FIG. 9 is a schematic view illustrating an internal structure of a computing device for controlling a tactile interface device according to an embodiment of the present invention.

FIG. 9 is a schematic view illustrating an internal structure of a computing device for controlling a tactile interface device according to an embodiment of the present invention.

The computing device for controlling the tactile interface device according to an embodiment of the present invention may include a processor, a network interface, a memory, and a bus (corresponding to a bi-directional arrow between the processor, the memory, and the network interface). The memory may include an operating system 5100, an input/output control routine 5200, and an application 5300. The processor may include an input/output control unit 2000 and an application execution unit 3000. In other embodiments the computing device for controlling the tactile interface device may include components more than components of FIG. 9.

The memory is a computer-readable recording medium, and may include a permanent mass storage device such as a random access memory (RAM), a read only memory (ROM), and a disk drive. In addition, a program code for the operating system 5100, input/output control routine 5200, and application 5300 may be stored in the memory. The above software components may be loaded from a recording medium which is readable in an additional computer other than the memory by using a drive mechanism (not shown). The above recording medium readable in the additional computer may include a computer-readable recording medium (not shown) such as a floppy drive, a disk, a tape, a DVD/CD-ROM drive, and a memory card. In other embodiments, the software components may be loaded into the memory via the network interface unit 4000 other than the computer-readable recording medium.

The bus may enable communication and data transmission between the components of the computing device for controlling the tactile interface device. The bus may be configured by using a high-speed serial bus, a parallel bus, a storage area network (SAN), and/or other suitable communication technologies.

The network interface unit 4000 may be a computer hardware component for connecting the computing device for controlling the tactile interface device to a computer network. The network interface unit 4000 may connect the computing device for controlling the tactile interface device to the computer network via a wireless or wired connection. Via the above network interface unit 4000, the computing device for controlling the tactile interface device may be connected to the tactile interface device in a wireless or wired manner.

The processor may be configured to process an instruction of the computer program by performing a basic calculation and logic, and an input/output operation of a computing device for controlling the tactile interface device. The instruction may be provided to the processor by the memory or the network interface unit 4000 and via the bus. The processor may be configured to execute program codes for the input/output control unit 2000 and the application execution unit 3000. The above program codes may be stored in a recording device such as the memory.

The input/output control unit 2000 and the application execution unit 3000 may be configured to perform the method of controlling the tactile interface which is described hereinafter. In the above processor, according to the method of controlling the tactile interface device, some components may be omitted, additional components not shown may be further included, or at least two components may be combined.

Figure 10:
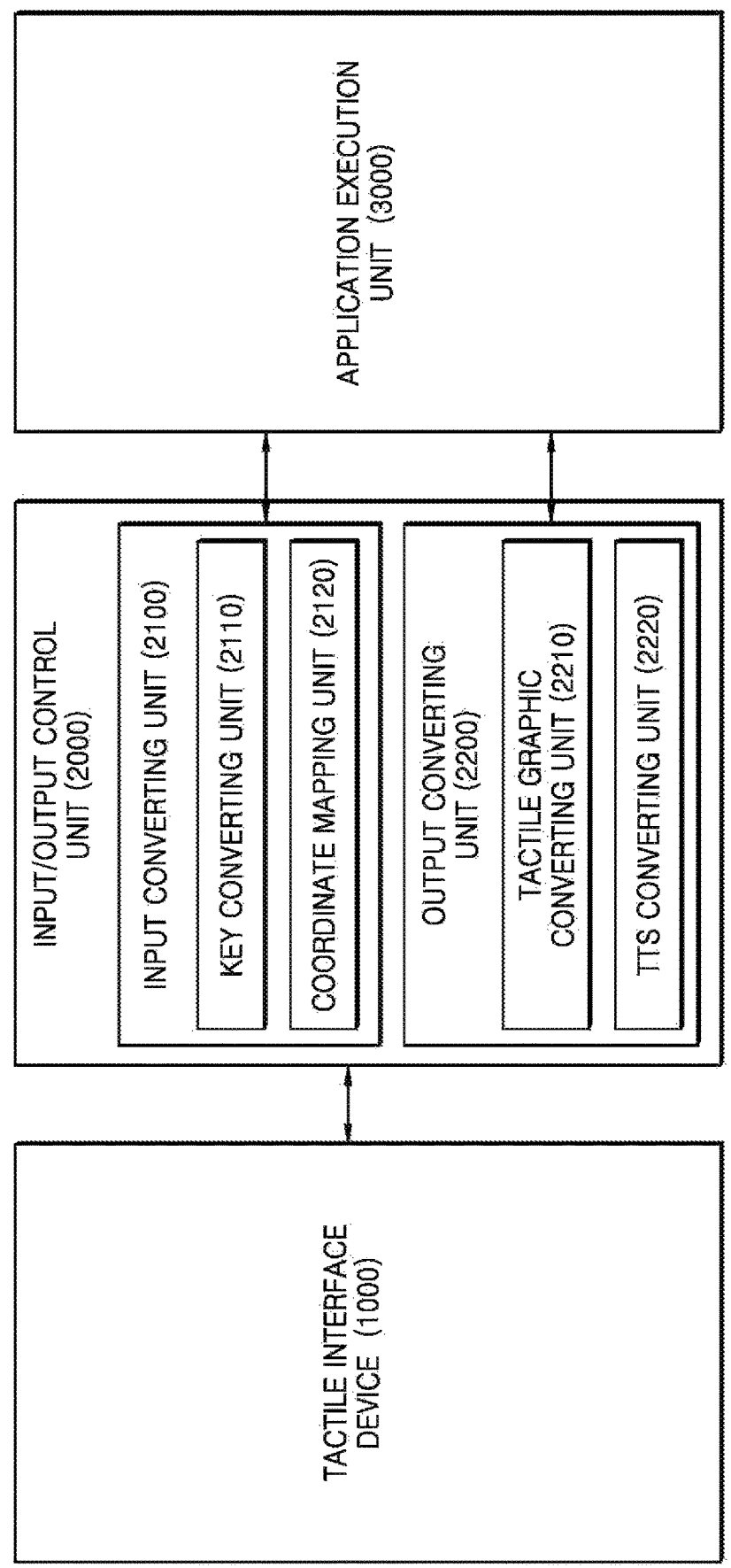
FIG. 10 is a schematic view illustrating an internal structure of a partial component of a computing device for controlling a tactile interface device according to an embodiment of the present invention.

FIG. 10 is a schematic view illustrating an internal structure of a partial component of a computing device for controlling a tactile interface device according to an embodiment of the present invention.

The computing device B according to the present invention includes the input/output control unit 2000 for controlling a mutual input/output between the application execution unit 3000 and the tactile interface device.

The application execution unit 3000 is a term indicating a module capable of executing an application for performing functions provided in the OS by default (such as Explorer in WINDOWS™), an application for performing functions provided in the OS subsidiarily (such as Notepad in WINDOWS™), an application installed separately from the OS for performing independent functions (such as MS WORD™), an application that performs independent functions executed on the Web, and an application operated only in an app of a smart phone or a specific device. In other words, the application execution unit 3000 inclusively denotes a module that executes programs having executable instructions stored in the memory.

An ordinary user may execute the above application in the computing device B and interact with the application by using a mouse, a keyboard, a monitor, a touch pad, or the like, however, the above usual devices are interacted based on graphic information that is difficult to be recognized by the visually impaired.

In the present invention, the interface or the input/output of the application executed by the application execution unit 3000 is converted and controlled in the form to be used by the visually impaired so as to enable the visually impaired to use the application executed by the application execution unit 3000 of the computing device B.

In addition, the method of controlling the tactile interface device of the present invention may be applied not only for the purpose of the visually impaired but also for an input/output system and a PC utilizing tactile information to be subsidiarily used in other devices such as a vehicle or a flight device.

According to an embodiment of the present invention, the input/output control unit 2000 converts the input/output of the application executed in the application execution unit 3000 into a form that can be used by the visually impaired, and implements the converted input/output in the tactile interface device, and the user can use the application more intuitively and conveniently through the tactile interface device.

Particularly, because the tactile interface device 1000 is a device capable of transmitting information to the user by using the tactile information, and receiving information or instructions from the user through a tactile key input or the like, the visually impaired can use the application execution unit without inconvenience.

As shown in FIG. 10, the input/output control unit 2000 includes an input converting unit 2100 for converting an input from the tactile interface device into an input to the application execution unit 3000; and an output converting unit 2200 for converting an output from the application execution unit 3000 into an output of the tactile interface device.

Preferably, according to the device for controlling the tactile interface device of an embodiment of the present invention, the information inputted from the tactile interface device is converted into a form usable in the application execution unit 3000 to input the converted information to the application execution unit 3000 may be performed in addition to an operation of displaying the output information from the application execution section 3000 in a tactile display form.

In other words, according to the present invention, the user does not passively receive information but inputs information based on recognized information, and the input/output control unit 2000 converts the above inputted information into a form that can be input to the application execution unit 3000, thereby enabling the visually impaired user to use the application executed in the application execution unit 3000 at a level similar to that of the usual user.

Meanwhile, the input converting unit 2100 includes a key converting unit 2110 for converting a key input inputted from the tactile interface device into a form that can be inputted to the application execution unit 3000; and a coordinate mapping unit 2120 for converting input coordinates inputted or changed by a keypad or the like in the tactile interface device into input coordinates in the application execution unit 3000;

Preferably, the input received from the tactile interface device and converted by the key converting unit 2110 is information inputted by braille, direction key, shortcut key, and the like.

Meanwhile, the coordinate mapping unit 2120 is configured to convert the input coordinates or a cursor position in the tactile interface device into the input coordinates in the application execution unit 3000. The input coordinates or the cursor position may be generated or changed by the input of the direction key of the tactile interface device.

As described hereinafter, when an electronic device is a PC, tactile icons are implemented in the tactile graphic which is outputted after reconfiguring the GUI elements of a monitor display screen of the PC. The above tactile icons do not spatially one-to-one match with the monitor display screen. Therefore, when focusing is specifically performed in the tactile interface device (when focusing is performed more specifically in the focusing area described later), or when the input coordinates where the cursor is located is used without change, the application execution unit 3000 of the electronic device cannot recognize where the event comes from among the GUI elements.

Preferably, the coordinate mapping function of the coordinate mapping unit 2120 may be a function to map a tactile icon object currently being outputted as the tactile graphic with the GUI element displayed on the monitor display screen when the application execution unit 3000 is actually driven, in which the coordinate mapping unit 2120 maps the recognized coordinates by constituting a mapping table.

The tactile graphic displayed on the tactile interface device and the display screen upon normally executing the application execution unit 3000 may be different from each other in resolution, configuration, and position. In the above case, the input coordinates in the tactile interface is required to be converted or mapped to the input coordinates in the application execution unit 3000 so as to input the instruction inputted from the tactile interface device to the application execution unit 3000 without limitation, in which the converting or mapping is performed by the coordinate mapping unit 2120. By the above coordinate mapping unit 2120, the user may use the function of the application execution unit 3000 at a level of the usual user without reducing or simplifying the function of the application execution unit 3000.

For example, when the user performs a key input related to the execution at a point corresponding to the 'A' in the tactile interface device in order to execute an instruction 'A' in the application execution unit 3000 (for example, when the user opens a My Documents folder in the Windows desktop screen), the coordinate mapping unit 2120 maps the coordinates at the point in the tactile interface device to the coordinates of the icon 'A' of the connected application execution unit 3000, and thus, the 'A' instruction in the application execution unit 3000 may be executed.

Accordingly, the input converting unit 2100 may perform a coordinate mapping function for informing the application execution unit of a GUI element corresponding to the input coordinates or the cursor position, and a reverse braille translation function for converting the braille information inputted from the braille key into ordinary characters.

Meanwhile, the output converting unit 2200 includes a tactile graphic converting unit 2210 for converting a focus area corresponding to a part or whole of the display screen outputted from the application execution unit 3000 into the tactile graphic data, and the tactile graphic provided by the tactile interface device may be implemented from the tactile graphic data.

In the present specification, the "display screen" denotes a concept including a visual screen outputted to a usual visual display device such as a monitor by the application, and a visual element included in the visual screen.

Meanwhile, the output converting unit 2200 further includes a TTS converting unit 2220 for converting the information outputted from the application execution unit 3000 into voice information. Preferably, the TTS converting unit 2220 converts detailed information in a textual form with respect to the tactile element, which is indicated by the input from the tactile interface device or positioned by the input coordinates, into voice.

Meanwhile, when the application execution unit 3000 is actual driven, and when all of the GUI elements outputted on the monitor display screen are converted into tactile graphics and outputted to the tactile interface device, the user may have the difficulty to understand the tactile graphics.

Therefore, according to an embodiment of the present invention, the focus area of the display screen outputted from the application execution unit 3000 is converted into the tactile graphic data. In other words, only or around the focus area corresponding to the area focused by the user is converted into the tactile graphic data and then displayed as the tactile graphic, such that the user can quickly and conveniently recognize only the area currently focused, thus an error in recognition and input of the user can be removed.

Meanwhile, the focus area is determined by at least one of the previous inputs by the user. For example, when the user shifts the input coordinates in the application through the direction key input of the tactile interface device, or when an area indicated by the corresponding input coordinates is focused by a key input such as an execution key input, the focus area is determined.

Meanwhile, the tactile graphic converting unit 2210 defines the focus area into a plurality of focus partial areas, and performs an operation of converting a display element of each of the focus partial areas into a tactile graphic element according to a preset conversion rule, thereby generating tactile graphic data.

FIG. 16 shows an example of the preset conversion rule for converting the display element into the tactile graphic element.

Figure 20:
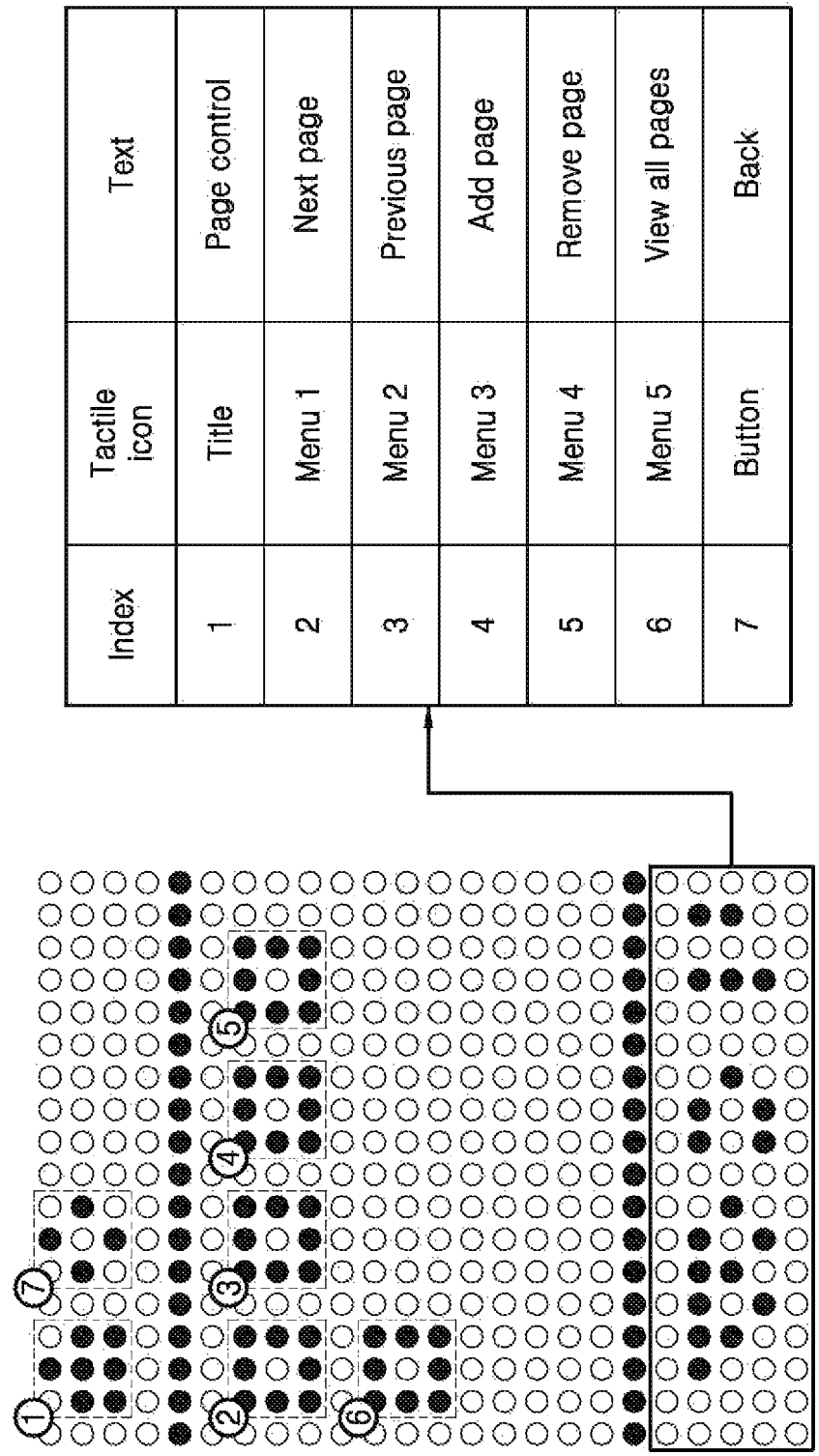
FIG. 20 is a view illustrating a tactile graphic converted according to an embodiment of the present invention by using a second example of a display screen shown in FIG. 19.

For example, in FIG. 16, when the display element (GUI element) corresponds to a 'Button', the form displayed on the display screen of the computing device by the application execution unit 3000 is a GUI having the form shown in the item indicating "Visual Design" in FIG. 20. In addition, according to the conversion rule shown in FIG. 16, the above display element for the 'Button' is converted into a tactile icon as the tactile graphic element which can be expressed into the tactile graphic, and the converted tactile icon is implemented as the tactile graphic in the tactile interface device.

Meanwhile, by the key input of the user in the tactile interface device, preferably, by a shortcut key input for outputting the text information of the display element indicated by the input coordinates or the tactile icon in the form of a sound, or a shortcut key input for outputting the text information of the display element indicated by the input coordinates in the form of the braille, the detailed information about the display element or the tactile icon may be outputted in the form of the braille tactile graphic of the tactile interface device or the voice by the TTS conversion.

Figure 15:
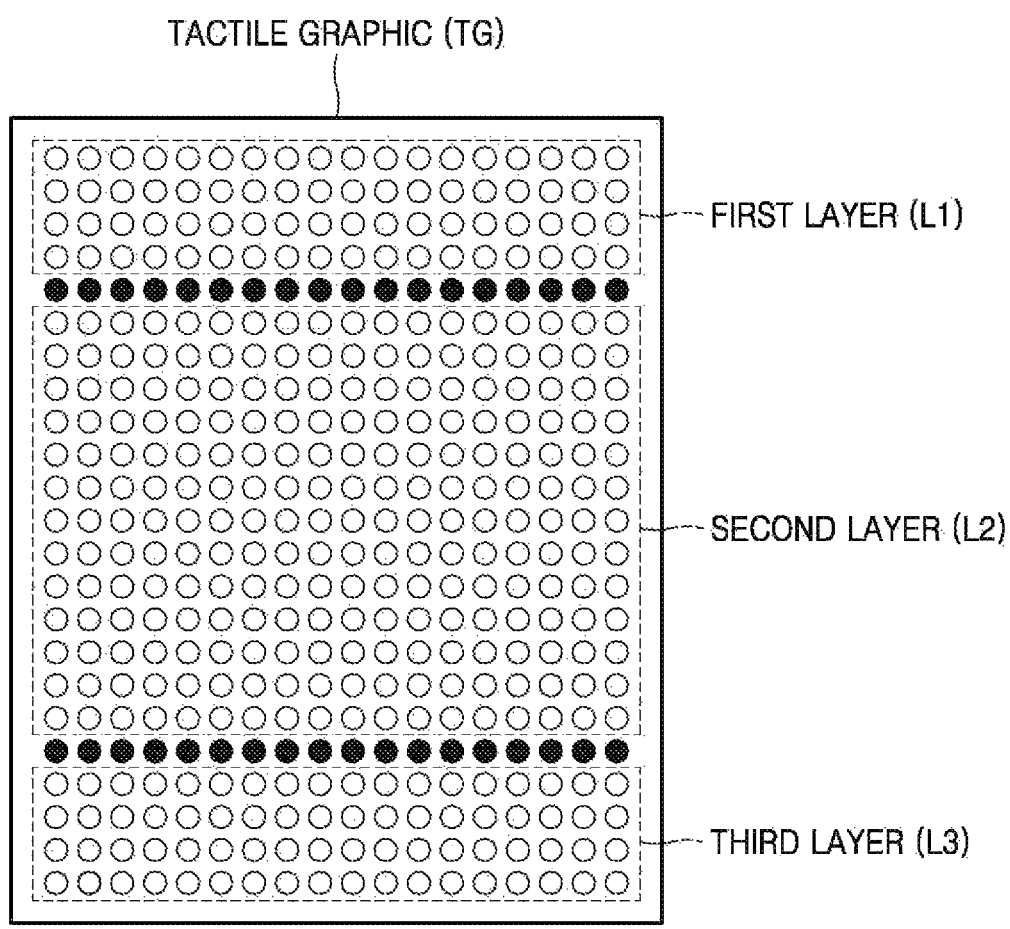
FIG. 15 is a schematic view illustrating a tactile graphic according to an embodiment of the present invention.

FIG. 15 is a schematic view illustrating a tactile graphic TG according to an embodiment of the present invention.

The tactile graphic includes a plurality of layers, and the layers include a first layer 4100, a second layer 4200, and a third layer 4300 in the embodiment shown in FIG. 15. The focus partial areas correspond to the layers, respectively. In other words, the focus area including a part of the display screen outputted from the application execution unit 3000 is formed of a plurality of focus partial areas, and the focus partial areas correspond to the layers, respectively. Accordingly, the tactile graphic converting unit 2210 converts the display screen into the tactile graphic for each focus partial area or layer.

The first layer 4100 is a screen control area, and may include at least one of an icon indicating a title of the tactile graphic currently outputted from the tactile interface device, and tactile icons of the buttons for switching screens, such as 'previous', 'confirm', 'cancel', and 'close'. In other words, the first layer 4100 includes the tactile icon for executing an instruction to change a screen of the display screen outputted from the application execution unit 3000.

The second layer 4200 is a layer for providing a tactile graphic for a button, a menu, a folder, graphic information, and the like to a main screen area. The user may perform the text input, recognize the graphic information, recognize GUI elements, or perform user control input through the second layer 4200.

The third layer 4300 is a layer for displaying detailed information on the tactile graphic element outputted from the application execution unit 3000 in the form of the braille. The user may confirm the detailed information on the tactile elements by recognizing the braille outputted to the third layer 4300. As described aforesaid, the above confirmation of the detailed information may also be performed by the voice converted by the TTS converting unit 2220.

Meanwhile, as for the above-mentioned tactile interface device and the computing device for controlling the same, embodiments have been described in the aspect of the tactile interface device capable of output and input and the control for the same, however, the present invention is not limited thereto, and also includes a methods, a device, and non-transitory computer-readable medium for controlling a tactile interface device capable of output only or a tactile interface device capable of input only.

Figure 11:
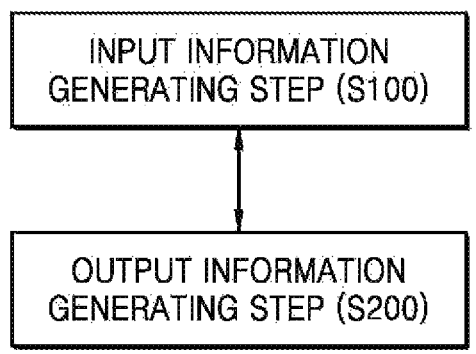
FIG. 11 is a schematic view illustrating steps of a method of controlling a tactile interface device according to an embodiment of the present invention.

FIG. 11 is a schematic view illustrating steps of a method of controlling a tactile interface device according to an embodiment of the present invention.

As shown in FIG. 11, the method of controlling a tactile interface device implemented by a computing device and connected to the computing device to interact with the user according to the embodiment includes: an input information generating step S100 of generating input information to an application being executed in the computing device based on an input at the tactile interface device; and an output information generating step S200 of generating output information to the tactile interface device based on an output of a focus area among outputs from the application being executed in the computing device. The output information includes data capable of implementing a tactile graphic formed of a plurality of two-dimensional tactile pixels.

The tactile interface device may provide a tactile graphic by tactile sensation, and the input information generation step S100 and the output information generation step S200 may be performed in real-time. In detail, the user may recognize the tactile graphic outputted in the output information generating step S200 and perform an input based on the tactile graphic, and, preferably, the input of the user may be converted into the form to be inputted to the application execution unit 3000 or the input information may be generated in the input information generating step S100.

Figure 12:
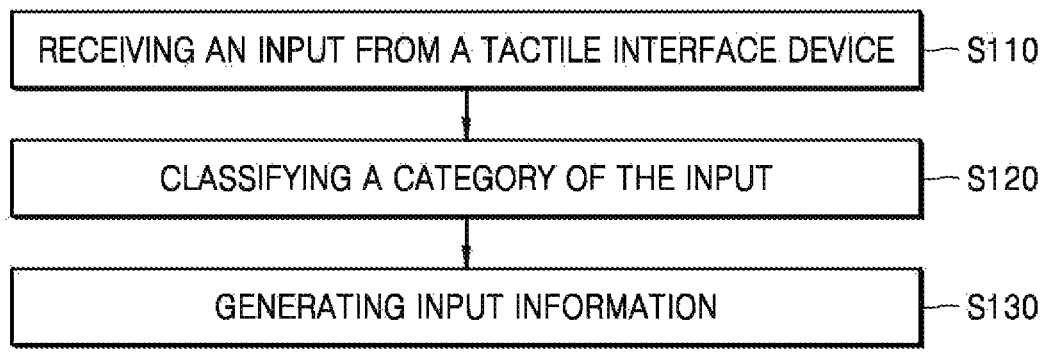
FIG. 12 is a schematic view illustrating processes of an input information generating step according to an embodiment of the present invention.

FIG. 12 is a schematic view illustrating processes of an input information generating step S100 according to an embodiment of the present invention.

The input information generating step S100 include: an input receiving step S110 of receiving an input from the tactile interface device; an input category classifying step S120 for classifying a category of the input information; and an application input generating step S130 for generating input information having a form to be inputted to the application or converting the input into input information having a form to be inputted to the application based on the input according to the input category.

The category of the input includes braille information by a braille key input, input coordinate shift information by a direction key input, and instruction information by instruction key input.

The braille key input is an input by a braille keyboard that converts character input signals to a computer by converting braille characters commonly used by the visually impaired to general characters. The above braille keyboard receives the braille and transmits the braille to the tactile interface device or the user terminal connected to the tactile interface device in the same manner as the braille keyboard which is conventionally and broadly used. Because the braille is formed of several dots to form a single letter, the braille keyboard can transmit information on simultaneously pressed buttons.

In other words, in the application input generating step S130, when the input category is the braille information, text information inputted from the input coordinates in the application may be generated according to the braille information.

The direction key input is an input for changing the input coordinates. The direction key may include up, down, left, and right, and the input coordinates and/or cursors in the application or the input coordinates and/or cursors in the display elements displayed in the tactile graphic may be shifted when the user inputs the direction key.

In an embodiment of the present invention, the input coordinates in the application may be changed according to the input of the direction key, and the changed input coordinates in the application may be implemented and displayed as the tactile graphic. Herein, the actual coordinates in the application executed in the computing device may be referred to as input coordinates, and the input coordinates in the tactile graphic implemented in the tactile interface device may be referred to as tactile input coordinates.

In an embodiment of the present invention, the tactile input coordinates indicating one of the display elements of the tactile graphic or an adjacent group may be change according to the input of the direction key, and the changed tactile input coordinates indicating the one of the display elements of the tactile graphic or the adjacent group may be mapped to the input coordinates in the application.

Alternatively, in one embodiment of the present invention, when the tactile input coordinates indicating one of the display elements of the tactile graphic or an adjacent group are change according to the input of the direction key, and a task such as executing or changing the display elements or the adjacent group indicated by the tactile input coordinates is performed, the input coordinates with respect to the one of the display elements of the tactile graphic or the adjacent group corresponding to finally changed tactile input coordinates may be mapped to the input coordinates in the application.

In other words, in the application input generating step S130, when the input category is the input coordinate shift information, new input coordinates in the application may be generated according to the input coordinate shift information.

When an electronic device is a PC, tactile icons are being implemented in the tactile graphic which is outputted after reconfiguring the GUI elements of a monitor display screen of the PC. When the input coordinates where the touch input is generated in the tactile interface device are used without change, the application execution unit 3000 of the electronic device cannot determine which GUI element the event has occurred for, because the above tactile icons do not one-to-one matched with the monitor display screen spatially. The application input generating step S130 with respect to key input having input coordinate shift information substantially corresponds to the coordinate mapping function. Preferably, when the tactile icon object currently being outputted as the tactual graphic and the actual application execution unit 3000 are driven, the recognized touch coordinates are mapped by forming mapping table so as to function for mapping a GUI element outputted on the monitor display screen.

The instruction information by the instruction key input includes an execution instruction, a space instruction, and at least one of preset shortcut instructions. More preferably, the instruction information may further include an instruction for executing the TTS or the braille output with respect to the detailed text information of the display element on which the input coordinates or the tactile input coordinates are mapped.

FIG. 13 is a schematic view illustrating processes of an output information generating step S200 according to an embodiment of the present invention. The output information generating step S200 is a step of converting a focus area including a part of the display screen outputted from the application execution unit 3000 into the tactile graphic data.

The output information generating step S200 includes: a step S210 of receiving output information of the application executed by the application execution unit 3000; a change determining step S220 of determining whether the display screen displayed in the focus area of the application executed by the application execution unit 3000 is changed; a tactile graphic generating step S230 for generating the tactile graphic data based on the display screen displayed in the focus area of the application executed by the application execution unit 3000; and a step S240 of transmitting the tactile graphic data to the tactile interface device.

Preferably, when the display screen is determined to be changed in the change determining step, the tactile graphic converting step may be performed.

Figure 14:
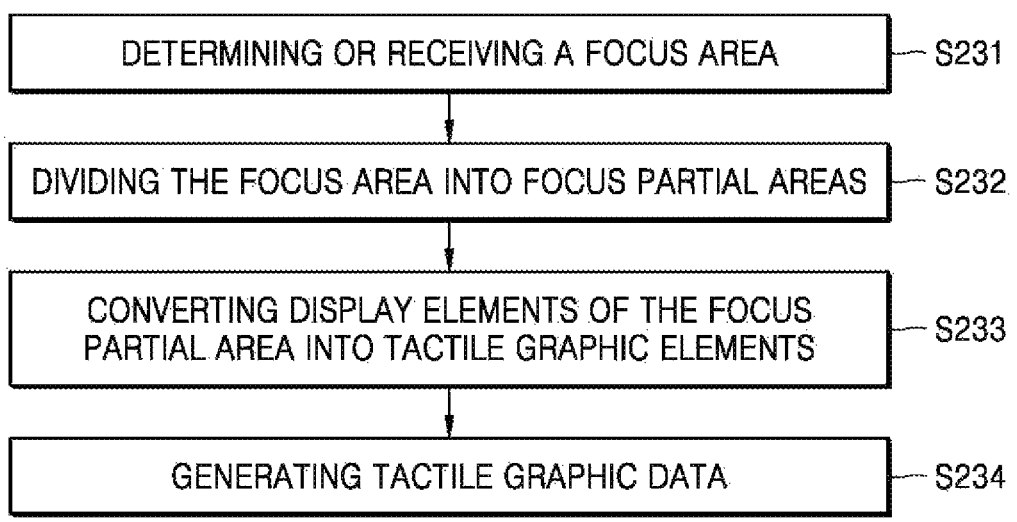
FIG. 14 is a schematic view illustrating processes of a tactile graphic converting step according to an embodiment of the present invention.

FIG. 14 is a schematic view illustrating processes of a tactile graphic converting step S230 according to an embodiment of the present invention.

When the application is actually executed by the application execution unit 3000 and when all of the GUI elements outputted on the monitor display screen are converted into tactile graphics and outputted to the tactile interface device, the user may have the difficulty to understand the tactile graphics.

Therefore, according to an embodiment of the present invention, the tactile graphic generating step S230 may preferably convert the focus area including the part of the display screen outputted from the application execution unit 3000 into the tactile graphic data. In other words, only or around the focus area corresponding to the area focused by the user is converted into the tactile graphic data and then displayed as the tactile graphics, such that the user can quickly and conveniently recognize only the area currently focused, thus an error in recognition and input of the user can be removed.

Meanwhile, the focus area is determined by at least one of the previous inputs by the user. For example, when the user shifts the input coordinates of the application or the tactile input coordinates in the tactile graphic by inputting the direction key of the tactile interface device, or when an area indicated by the corresponding input coordinates or tactile input coordinates is focused by a key input such as the execution key input after the input coordinates or the tactile input coordinates are shifted, the focus area may be determined.

In other words, the tactile graphic generating step S230 of converting the display screen displayed by the application execution unit 3000 into the tactile graphic data includes: a focus area determining/receiving step S231 of determining or receiving the focus area including the part of the display screen outputted from the application execution unit 3000;

a focus partial area defining step S232 of defining the focus area into a plurality of focus partial areas;

a tactile graphic element converting step S233 of converting the display element of focus partial areas into the tactile graphic element according to a preset conversion rule; and a tactile graphic data generating step S234 of generating the tactile graphic data including the tactile graphic element.

FIG. 16 shows an example of the preset conversion rule for converting the display element into the tactile graphic element.

For example, in FIG. 16, when the display element (GUI element) corresponds to a 'Button', the form displayed on the display screen of the computing device by the application execution unit 3000 is a GUI having the form shown in the item of Visual Design in FIG. 20. In addition, the above display element with respect to the 'Button' is converted into the tactile icon according to the conversion rule shown in FIG. 20, in which the tactile icon is a tactile graphic element that can be expressed as a tactile graphic, and then the converted tactile icon is implemented as the tactile graphic in the tactile interface device.

Meanwhile, by the key input of the user in the tactile interface device, preferably, by a shortcut key input for outputting the text information of the display element indicated by the input coordinates or the tactile icon in the form of a sound, or a shortcut key input for outputting the text information of the display element indicated by the input coordinates in the form of the braille, the detailed information about the display element or the tactile icon may be outputted in the form of the braille tactile graphic of the tactile interface device or the voice by the TTS conversion.

FIG. 15 is a schematic view illustrating a tactile graphic TG according to an embodiment of the present invention. The tactile graphic includes a plurality of layers, and the layers include a first layer 4100, a second layer 4200, and a third layer 4300 in the embodiment shown in FIG. 15.

The focus partial areas correspond to the layers, respectively. In other words, the focus area including a part of the display screen outputted from the application execution unit 3000 is formed of a plurality of focus partial areas, in which the focus partial areas correspond to the layers, respectively. Accordingly, the tactile graphic converting unit 2210 converts the display screen into the tactile graphic for each focus partial area or layer.

The first layer 4100 is a screen control area, and may include at least one of an icon indicating a title of the tactile graphic currently outputted from the tactile interface device, and tactile icons of the buttons for switching screens such as 'previous', 'confirm', 'cancel', and 'close'. In other words, the first layer 4100 includes a tactile icon for executing an instruction to change a screen of the display screen outputted from the application execution unit 3000.

The second layer 4200 is a layer in which a main screen area is provided with a tactile graphic for a button, a menu, a folder, graphic information, and the like. The user may perform the text input, recognize the graphic information, recognize GUI elements, or perform user control input through the second layer 4200.

The third layer 4300 is a layer for displaying detailed information on the tactile graphic element outputted from the application execution unit 3000 in the form of the braille. The user may confirm the detailed information about the tactile elements by recognizing the braille outputted to the third layer 4300. As described aforesaid, the above confirmation of the detailed information may also be performed by the voice converted by the TTS converting unit 2220.

Hereinafter, embodiments of the display screen outputted from the application execution unit 3000 and converted by the method of controlling the tactile display device according to the present invention will be described. Hereinafter, the preset conversion rule shown in FIG. 16, which converts the display element of the display screen into the tactile graphic element, will be applied.

Figure 17:
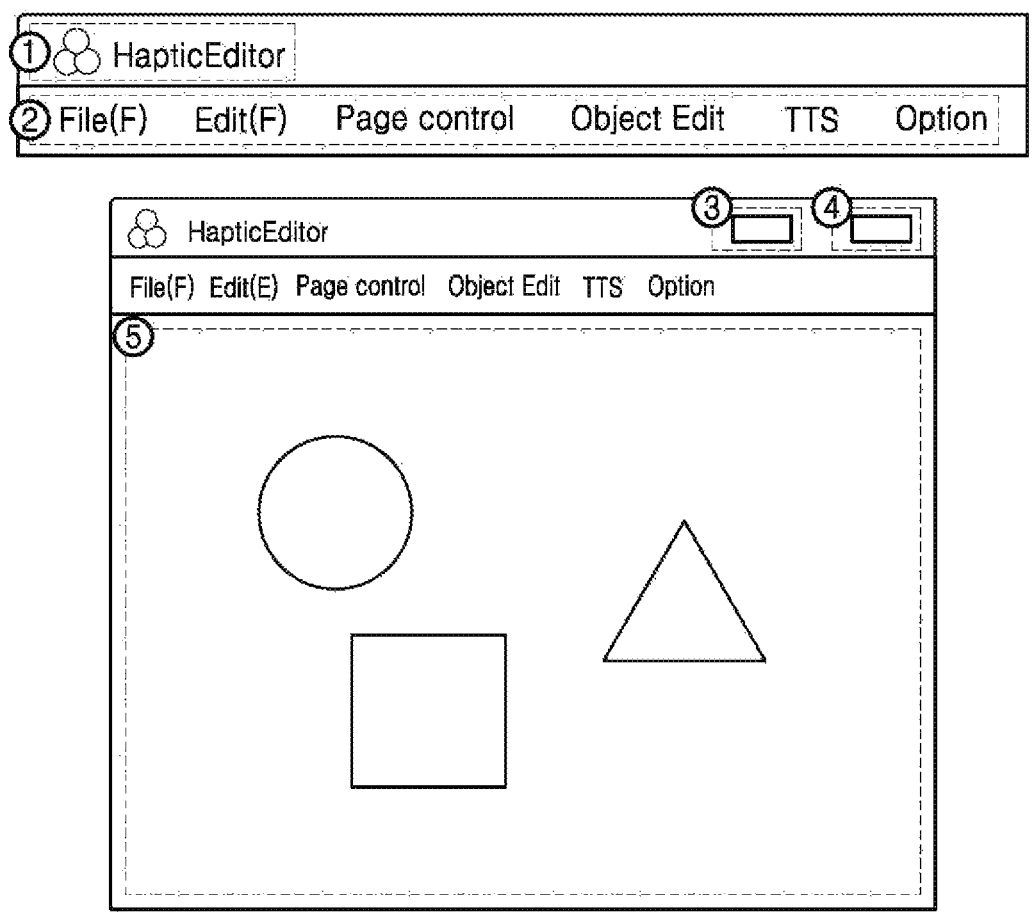
FIG. 17 is a view illustrating a first example of a display screen of a computing device.

FIG. 17 is a view illustrating a first example of a display screen of a computing device B.

In FIG. 17, the focus area corresponds to a window where the application is executed, and the focus partial area may be divided into a first focus partial area including ①, ②, ③, and ④, and a second focus partial area including ⑤.

The above ① corresponds to a title of the application, ② corresponds to a menu bar of the application, ③ corresponds to a 'Minimize' button of the application, ④ corresponds to a 'Close' button of the application, and ⑤ corresponds to a window displaying objects displayed in the application.

Figure 18:
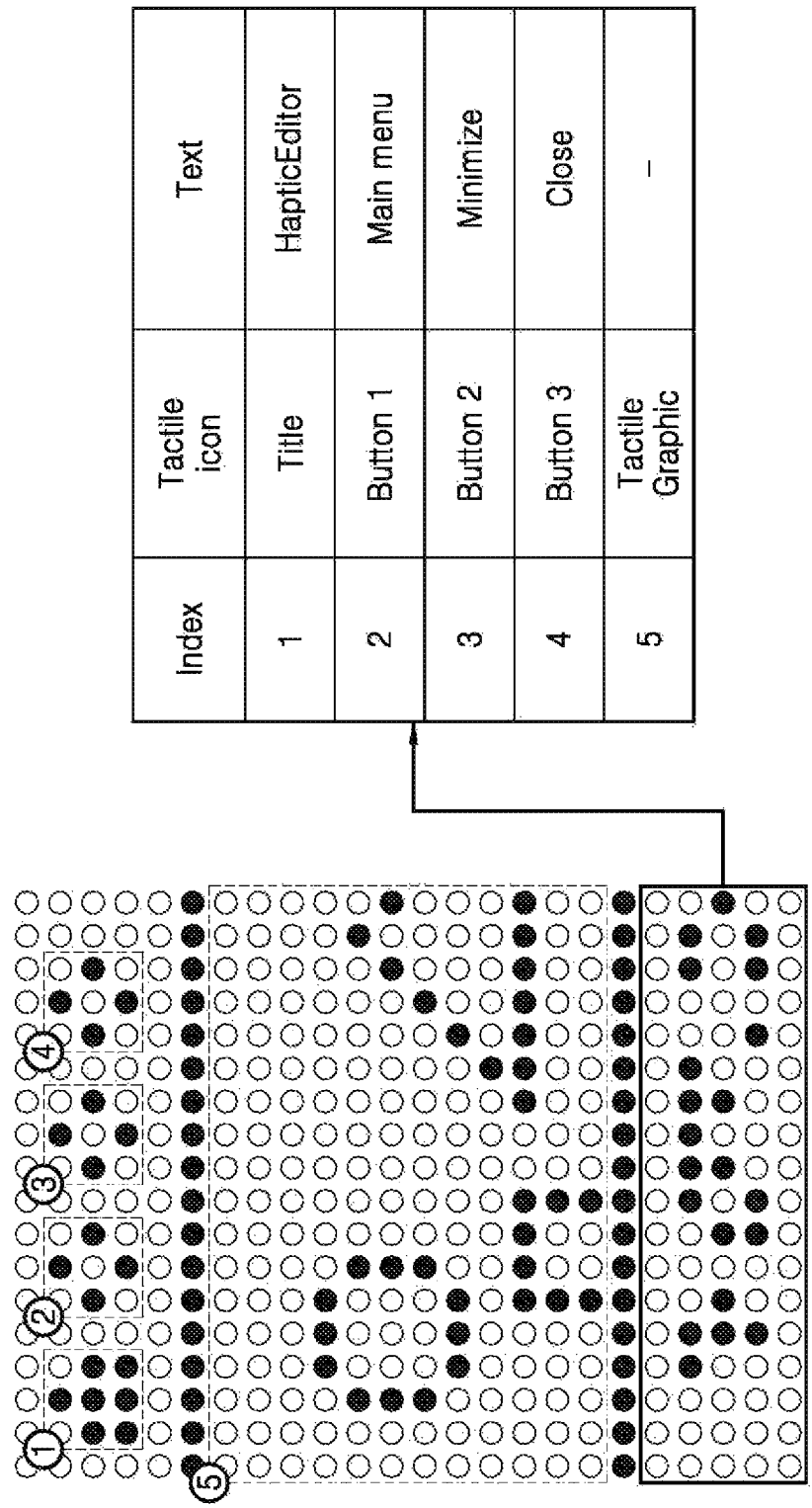
FIG. 18 is a view illustrating a tactile graphic converted according to an embodiment of the present invention by using a first example of a display screen shown in FIGS. 21A and 21B.

FIG. 18 is a view illustrating a tactile graphic converted and outputted according to an embodiment of the present invention by using a first example of a display screen shown in FIG. 17.

The first focus partial area including the above ①, ②, ③, and ④ is converted or mapped to a layer (first layer 4100) at an upper section of the tactile graphic, and the second focus partial area including the above ⑤ is converted or mapped to a layer (second layer 4200) at a middle section of the tactile graphic. As described above, the conversion rule upon mapping follows the rule shown in FIG. 16.

Meanwhile, a layer at a lower section of the tactile graphic corresponds to a layer that represents text information of the tactile icon in the first layer 4100 and the second layer 4200 in the form of the braille.

When the input coordinates or the tactile input coordinates are changed by the keypad, the above layer at the lower section may automatically indicate the text information of the tactile icon corresponding to the input coordinates or the tactile input coordinates in the form of the braille, or when the user enters the shortcut key, the above layer at the lower section may indicate the text information of the tactile icon corresponding to current input coordinates or tactile input coordinates in the form of the braille.

For example, the area ① corresponds to a title and is converted into a tactile icon preset by the conversion rule shown in FIG. 16, thereby being implemented in the first layer 4100 of the tactile graphic. In response to the above, when the user inputs a shortcut key for displaying braille information by arranging the input coordinates or tactile input coordinates on the tactile icon corresponding to the area ①, a 'Haptic Editor' corresponding to the detailed information of the title may be outputted in the braille form in the third layer 4300. Alternatively, when the user changes the input coordinates or the tactile input coordinates to the tactile icon corresponding to the area ①, "Haptic Editor" corresponding to the detailed information of the title may be automatically outputted in the braille form in the third layer 4300.

Figure 19:
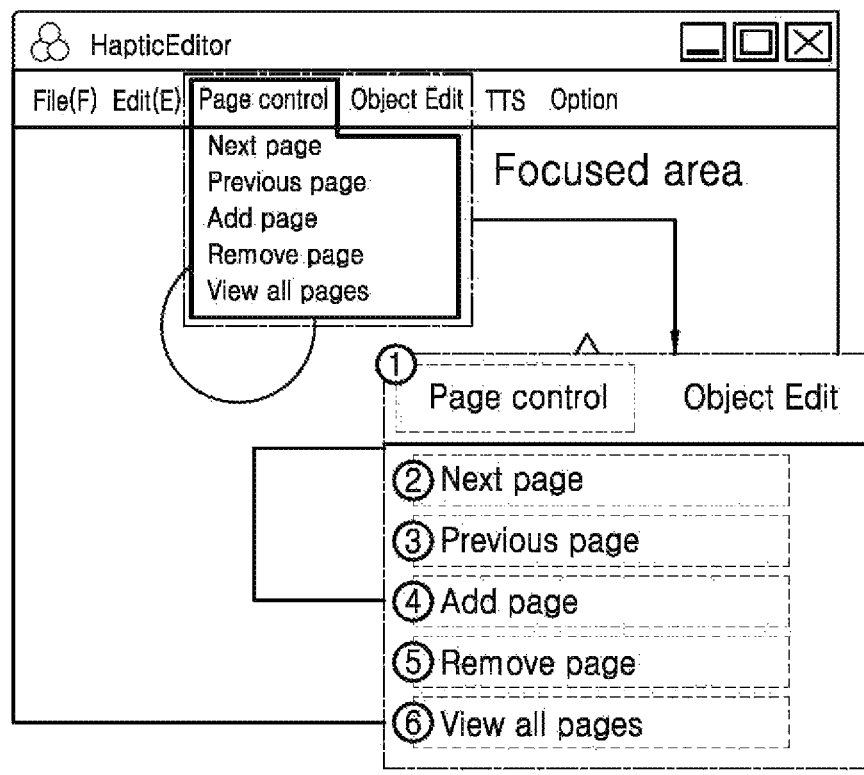
FIG. 19 is a view illustrating a second example of a display screen of a computing device.

FIG. 19 is a view illustrating a second example of a display screen of a computing device B.

The display screen of FIG. 19 is a display screen when a menu bar corresponding to the area 2 is selected in the application shown in FIG. 17 and 'Page Control' is inputted or selected in the menu bar.

In the above case, the focus area may correspond to an area indicated as "Focused area" in FIG. 19, and the focus partial area may be divided into a first focus partial area including ① and a second focus partial area including ② to ⑥.

The above ① corresponds to the title selected in the menu bar, and the above ② to ⑧ correspond to sub-menus to be selected in the title.

FIG. 20 is a view illustrating a tactile graphic converted and outputted according to an embodiment of the present invention by using a second example of a display screen shown in FIG. 19.

The first focus partial area including the above ① and ⑦ is converted or mapped to a layer (first layer 4100) at an upper section of the tactile graphic, and the second focus partial area including the above ② to ⑤ is converted or mapped to a layer (second layer 4200) at a middle section of the tactile graphic. As described above, the conversion rule upon mapping follows the rule shown in FIG. 20. Meanwhile, ⑦ is a tactile icon for a 'Back' button, and corresponds to an icon generated by itself to increase the convenience for the user in the controlling method according to the present invention, although not actually included in the display screen of the application.

Meanwhile, a layer at a lower section of the tactile graphic corresponds to a layer that represents text information of the tactile icon corresponding to the input coordinates or tactile input coordinates in the first layer 4100 and the second layer 4200 in the form of the braille.

FIGS. 21A to 27B are views illustrating outputs of a tactile interface device based on an operation of a user according to an embodiment of the present invention.

The method of controlling a tactile interface device implemented by a computing device and connected to the computing device to interact with the user according to an embodiment of the present invention includes: an input information generating step of generating input information into an application being executed in the computing device based on an input at the tactile interface device; and an output information generating step of generating output information to the tactile interface device based on an output of a focus area among outputs from the application being executed in the computing device, in which the output information includes data capable of implementing a tactile graphic formed of a plurality of two-dimensional tactile pixels.

The above method of controlling the tactile interface device enables even the visually impaired to efficiently operate an operating system and an application, such as in a control and an information input, based on the haptic display.

According to an embodiment of the present invention, primarily, the user may perform the control and information input with respect to the tactile interface device by using the key input such as the braille key and the direction key, and secondarily, the inputted items may be inputted to the operating system or the application being executed in the application execution unit.

Meanwhile, in an embodiment of the present invention, the visually impaired can control the operation of the operating system (such as Windows/Android/iOS/Linux) and applications used by the ordinary people based on the haptic display, and the visually impaired user can shift the input coordinates to a desired position in the current application upon inputting information. In addition, the user can figure out which display element the current input coordinates are located.

The shift of the input coordinates may be performed by the key input such as the direction key as described above. Meanwhile, in an embodiment of the present invention, a current position of the input coordinates on the display element is indicated as the tactile graphic.

In other words, the output information generating step includes a tactile graphic generating step of generating tactile graphic data based on the input coordinates in the focus area as well as the display screen displayed in the focus area in the application, in which the tactile graphic is implemented based on the tactile graphic data.

Meanwhile, the tactile graphic data includes data for implementing a tactile graphic element converted from the display element of the display screen according to the preset conversion rule and the graphic of the display screen or a graphic element formed by simplifying the graphic.

Herein, the display element and the graphic element correspond to the above GUI element shown in FIG. 16.

Meanwhile, the graphic or the graphic element of the display screen corresponds to a line, a circle, a triangle, and the like that constitutes a picture other than an icon or a folder.

In an embodiment of the present invention, the user may figure out a position of current input coordinates through the tactile graphic. More preferably, the input coordinates correspond to each position of the tactile graphic element or the graphic element.

In other words, when a first tactile graphic element, a second tactile graphic element, a first graphic element, a third tactile graphic element are outputted from the tactile interface device, and the current input coordinates are located in the first tactile graphic element, if the user presses the direction key to move to the right, the input coordinates shift to the second tactile graphic element, such that the user can recognize the shifted input coordinates by using the tactile sense. Likewise, when the input coordinates are located in the second tactile graphic element afterwards, if the user further presses the direction key to move to the right, the iput coordinates may shift to the first graphic element. In other words, preferably, the input coordinates may be inputted discontinuously so as to correspond to the positions of the tactile graphic element or the graphic element. In other words, when the user presses the direction key, the input coordinates in the application shifts, in which the input coordinates may preferably shift based on the tactile graphic element or the graphic element displayed at the output of the tactile interface device instead of continuously shifting by one pixel.

According to a preferred embodiment of the present invention, the tactile graphic is outputted in real time to allow the user to tactilely recognize the current input coordinates. Specifically, in the tactile graphic generating step, when the input coordinates are placed in the tactile graphic element or the graphic element, tactile graphic data for upwardly and downwardly moving at least one of the tactile pixels of a detailed area of the tactile graphic corresponding to the tactile graphic element or the graphic element is generated. In other words, in the case of the tactile graphic element or graphic element arranged thereon with the input coordinates, the tactile pixel of a part of the corresponding area moves up and down, and the user senses the periodically changed tactile pixel even though the user does not input, thereby grasping which icon, graphic element or the like the input coordinates of the user are located on.

In addition, in the output information generating step, braille information expressed in the tactile interface device by a tactile pixel or sound information reproduced in the tactile interface device by the tactile interface device is generated based on detailed information of the tactile graphic element corresponding to the input coordinates in order to enable the visually impaired to recognize the detailed information of the tactile graphic element, in which the output information to the tactile interface device may include the braille information or the sound information.

Hereinafter, the tactile graphical display screens of the method of controlling the tactile interface device according to an embodiment of the present invention will be described with reference to FIGS. 21A to 27B.

The configuration of the tactile interface device used in the method of controlling the tactile interface device according to the embodiment shown in FIGS. 21A to 27B is as follows.

(Output Unit)

1. Tactile pixels formed of multiple arrays: a graphic user interface (GUI) such as a folder and an icon of an operating system, or a menu and a button of an application, a graphic element (an image), and text braille information included in the folder and the icon of the operating system, or the menu and the button of the application is outputted in a tactile graphic form that can be recognized by the visually impaired.

(Input Unit)

2. Braille keyboard/direction key-based control/input interface: the visually impaired performs operating functions as same as the ordinary people operate the operating system and the applications using the keyboard, based on the above-mentioned direction key, braille keyboard and shortcut key.

(1) The directional key formed of up/down/left/right buttons for enabling the visually impaired to control the folder and icon of the operating system or the menu and button of the application by the operation (focus shifting with respect to components) same as the direction key of the general keyboard.

(2) The braille keyboard (including execution and space keys; execution—double click/space—click) and a plurality of shortcut buttons for enabling the operating system and the applications to be inputted with information and executed in the same manner of the general keyboard.

Figure 21B:
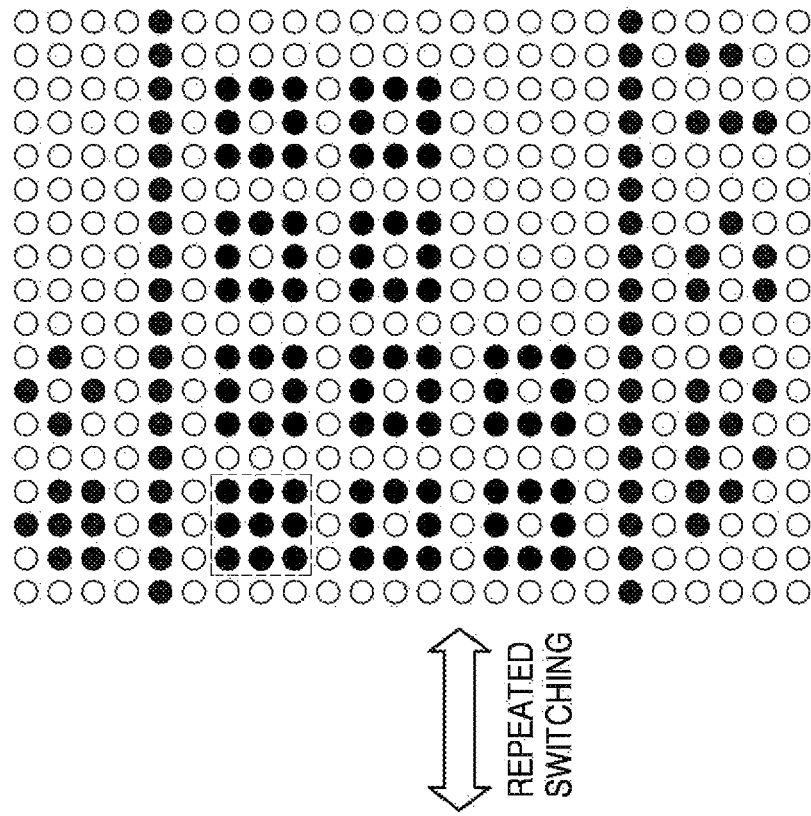
Figure 21A:
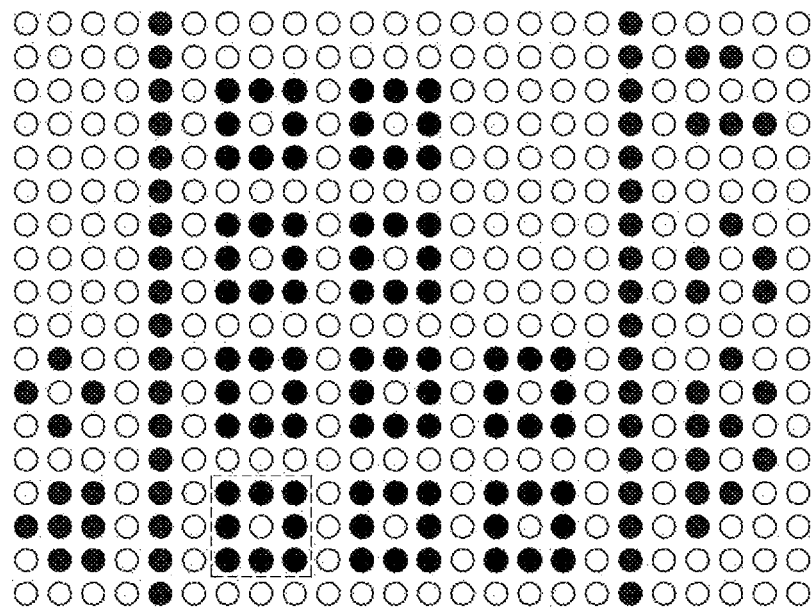

FIG. 21A and FIG. 21B are views illustrating a tactile graphic of a control/input interface according to an embodiment of the present invention.

In FIG. 21A and FIG. 21B, the input coordinates are located in the first tactile graphic element (dot-lined area) in the second layer (the layer at the middle section). Herein, the tactile graphics generation step includes a step of generating tactile graphic data for upwardly and downwardly moving the tactile pixels of the center (2,2) in real time in the detailed area of the 3×3 tactile pixels indicating the first tactile graphic element in real time, in which the tactile interface device may output the above tactile graphic data, so that the user can confirm current input coordinates or components being focused in detail.

In other words, the tactile graphics of FIGS. 21A and 21B are switched alternately and periodically, so that the user can confirm which tactile graphic element the current input coordinate is arranged on.

Meanwhile, the lowermost third layer may output braille information of the tactile graphic element on which the current input coordinate is arranged.

FIG. 22A and FIG. 22B are views illustrating a tactile graphic of a control/input interface according to an embodiment of the present invention.

FIG. 22A and FIG. 22B correspond to the tactile graphic after the user inputs a right direction key in a state of the tactile graphic display of FIG. 21A and FIG. 21B. In FIG. 22A and FIG. 22B, the input coordinates are located in the second tactile graphic element (dot-lined area) in the second layer (the layer at the middle section). Herein, the tactile graphics generation step includes a step of generating tactile graphic data for upwardly and downwardly moving the tactile pixels of the center (2,2) in real time in the detailed area of the 3×3 tactile pixels indicating the second tactile graphic element in real time, in which the tactile interface device may output the above tactile graphic data, so that the user can confirm current input coordinates or components being focused in detail.

In other words, the tactile graphics of FIGS. 22A and 22B are switched alternately and periodically, so that the user can confirm which tactile graphic element the current input coordinate is arranged on after inputting the direction key.

FIG. 23A and FIG. 23B are views illustrating a tactile graphic of a control/input interface according to an embodiment of the present invention.

FIG. 23B corresponds to the tactile graphic after the user inputs an execution key in a state of the tactile graphic display of FIG. 23A. FIG. 23B is a tactile graphic after executing an instruction such as executing a second tactile graphic element in which the input coordinates are arranged, or opening a folder in FIG. 23A. In other words, FIG. 23B corresponds to a tactile graphic of an execution screen or detail folder with respect to the second tactile graphic element in which the input coordinates are located in FIG. 23A.

Meanwhile, in the embodiment, the input coordinates are not immediately displayed (for example, a cell of (2, 2) moved up and down) after a new tactile graphic element is executed, in which, when the user inputs an additional key such as the direction key, the Input coordinates may be displayed.

FIG. 24A and FIG. 24B are views illustrating a tactile graphic of a control/input interface according to an embodiment of the present invention.

FIG. 24B corresponds to the tactile graphic after the user arranges the input coordinates on the third tactile graphic element and inputs the execution key in a state of the tactile graphic display as in FIG. 24A. FIG. 24B corresponds to an execution screen of an application for displaying a graphic element (an image) by using a tactile graphic. Herein, the tactile graphic of the inverted "U" corresponds to a tactile graphic element indicating a text input, and FIG. 24B corresponds to a tactile graphic in a state that a text can be inputted in the currently given image.

FIG. 25A and FIG. 25B are views illustrating a tactile graphic of a control/input interface according to an embodiment of the present invention.

The states of FIGS. 25A and 25B are repeatedly switched to each other. Herein, the tactile graphic of the inverted "U" corresponds to a tactile graphic element indicating a text input, and FIG. 25B corresponds to a tactile graphic in a state that a text can be inputted in the currently given image. Herein, the inverted U-shaped tactile graphic moves up and down periodically as a whole, and the user senses the above movement of the tactile cell, thereby grasping that the current input coordinates are located at an upper section over the square. Herein, the user inputs braille information, such that a function such as a text memo may be performed with respect to the graphic (image) currently being expressed by the tactile graphic.

FIG. 26A and FIG. 26B are views illustrating a tactile graphic of a control/input interface according to an embodiment of the present invention.

In FIG. 26A, the user inputs text information by using the braille key. Then, the tactile graphic is changed as shown in FIG. 26B.

Herein, an inverted U-shaped object (tactile graphic element) is temporarily or permanently stored in the corresponding image, and the presence of the above text information is expressed by the inverted U-shaped tactile graphic element.

FIG. 27A and FIG. 27B are views illustrating a tactile graphic of a control/input interface according to an embodiment of the present invention.

FIG. 27A corresponds to a screen after the user presses the downward direction key in a state of FIG. 26B. In other words, the user performs a text input with respect to a position of current input coordinates as shown in FIG. 26B, and when the input coordinates are changed as shown in FIG. 27A afterward, the tactile graphic as shown in FIG. 27A is expressed. Herein, because the text has already been inputted, the inverted U-shaped tactile graphic element remains as a tactile graphic.

Then, as shown in FIG. 27B, with respect to a rectangular graphic (image) in which the current input coordinates are located, all tactile cells expressing the entire image periodically move up and down. The user may recognize the element of the tactile graphic in which the current input coordinates are located by using the above real time tactile graphic.

Figure 28:
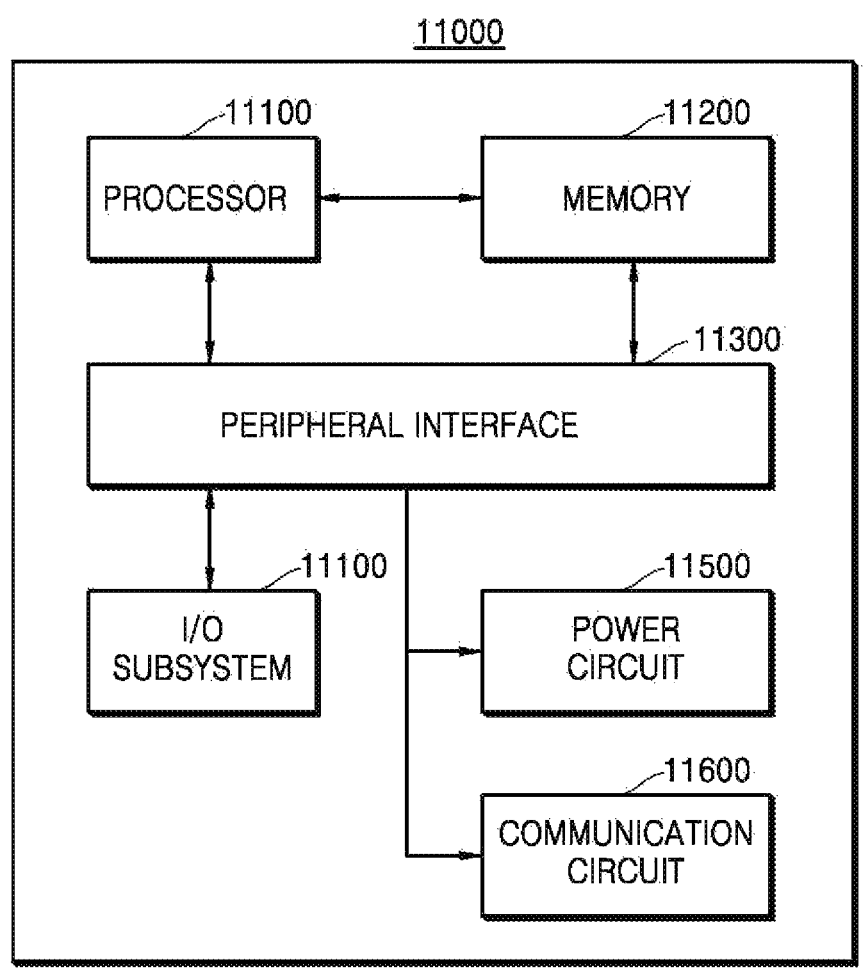
FIG. 28 is a view illustrating an example of an internal configuration of a computing device according to an embodiment of the present invention.

FIG. 28 is a block diagram for describing an example of an internal configuration of a computing device according to an embodiment of the present invention.

As shown in FIG. 28, the computing device 11000 may include at least one processor 11100, a memory 11200, a peripheral interface 11300, an I/O subsystem 11400, a power circuit 11500, and a communication circuit 11600. Herein, the computing device 11000 may correspond to a user terminal A connected to the tactile interface device or correspond to the above-mentioned computing device B.

The memory 11200 may include, for example, a high-speed random access memory, a magnetic disk, an SRAM, a DRAM, a ROM, a flash memory and a nonvolatile memory. The memory 11200 may include software modules, instruction sets, or various other data required for an operation of the computing device 11000.

Herein the access to the memory 11200 from other components of the processor 11100 or the peripheral interface 11300, may be controlled by the processor 11100.

The Peripheral interface 11300 may combine an input and/or output peripheral device of the computing device 11000 to the processor 11100 and the memory 11200. The processor 11100 executes the software module or the instruction set stored in memory 11200, thereby performing various functions for the computing device 11000 and processing data.

The I/O subsystem 11400 may combine various input/output peripheral devices to the peripheral interface 11300. For example, the I/O subsystem 11400 may include a controller for combining the peripheral device such as monitor, keyboard, mouse, printer, or a touch screen or sensor, if needed, to the peripheral interface 11300. According to another aspect, the input/output peripheral devices may be combined to the peripheral interface 11300 without passing through the I/O subsystem 11400.

The power circuit 11500 may provide power to all or a portion of the components of the terminal. For example, the power circuit 11500 may include a power management system, at least one power source such as a battery or an alternating current (AC), a charging system, a power failure detection circuit, a power converter or inverter, a power status indicator, and any other components for generating, managing, and distributing the power The communication circuit 11600 uses at least one external port, thereby enabling communication with other computing devices.

Alternatively, as described above, the communication circuit 11600 may include an RF circuit, if needed, to transmit and receive an RF signal, also known as an electromagnetic signal, thereby enabling communication with other computing devices.

The above embodiment of FIG. 28 is merely an example of the computing device 11000. In the computing device 11000, some components shown in FIG. 28 may be omitted, additional components not shown in FIG. 28 may be further provided, or a configuration or arrangement for combining at least two components may be provided. For example, a computing device for a communication terminal in a mobile environment may further include a touch screen, a sensor, and the like in addition to the components shown in FIG. 18, and the communication circuit may include a circuit for RF communication of various communication schemes (such as WiFi, 3G, LTE, Bluetooth, NFC, and Zigbee). The components that may be included in the computing device 11000 may be implemented by hardware, software, or a combination of both hardware and software which include at least one integrated circuit specialized in a signal processing or an application.

The methods according to the embodiments of the present invention may be implemented in the form of program instructions to be executed through various computing devices, thereby being recorded in a computer-readable medium. Particularly, a program according to the embodiment may be configured as a PC-based program or an application dedicated to a mobile terminal. The application to which the present invention is applied may be installed in the user terminal through a file provided by a file distribution system. For example, the file distribution system may include a file transmission unit (not shown) for transmitting the file according to a request of the user terminal.

The above-mentioned device may be implemented by hardware components, software components, and/or a combination of the hardware components and the software components. For example, the devices and components described in the embodiments may be implemented by using at least one general purpose computer or special purpose computer such as a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may execute an operating system (OS) and at least one software application executed on the operating system. In addition, the processing device may access, store, manipulate, process, and create data in response to the execution of the software. In some cases, one processing device is used for the further understanding, however, it will be appreciated by those skilled in the art that the processing device may include a plurality of processing elements and/or a plurality of types of processing elements. For example, the processing device may include a plurality of processors or one processor and one controller. In addition, other processing configurations, such as a parallel processor, may be possible.

The software may include a computer program, a code, and an instruction, or a combination of at least one thereof, and may configure the processing device to operate as desired, or may instruct the processing device independently or collectively. In order to be interpreted by the processor or to provide instructions or data to the processor, the software and/or data may be permanently or temporarily embodied in any type of machine, component, physical device, virtual equipment, computer storage media or device, or in a signal wave to be transmitted. The software may be distributed over computing devices connected to networks, thereby being stored or executed in a distributed manner.

The software and data may be stored in at least one computer-readable recording media.

The method according to the embodiment may be implemented in the form of a program instruction that may be executed through various computer mechanisms, thereby being recorded in a computer-readable medium. The computer-readable medium may include program instructions, data files, data structures, and the like, independently or in combination thereof. The program instructions recorded in the medium may be specially designed and configured for the embodiment, or may be known to those skilled in the art of computer software so as to be used. An example of the computer-readable medium includes a hard disk, a magnetic media such as a floppy disk and a magnetic tape, an optical media such as a CD-ROM and a DVD, a magneto-optical media such as a floptical disk, and a hardware device specially configured to store and execute a program instruction such as ROM, RAM, and flash memory. An example of the program instruction includes a high-level language code to be executed by a computer using an interpreter or the like, as well as a machine code generated by a compiler. The above hardware device may be configured to operate as at least one software module to perform the operations of the embodiments, and vise versa.

Although the above embodiments have been described with reference to the limited embodiments and drawings, however, it will be understood by those skilled in the art that various changes and modifications may be made from the above-mentioned description. For example, even though the described descriptions are performed in an order different from the described manner, and/or the described components such as system, structure, device, and circuit are coupled or combined in a form different from the described manner, or replaced or substituted by other components or equivalents, appropriate results may be achieved.

Therefore, other implementations, other embodiments, and equivalents to the claims are also within the scope of the following claims.

The invention claimed is:

1. A method of controlling a tactile interface device implemented by a computing device including a processor, and connected to the computing device to interact with a user, the method comprising:
   generating information inputted to an application configured to be executed in the computing device based on an input at the tactile interface device including a tactile display;
   selecting a focus area of a display screen of the computing device, based on outputs from the application, and identifying input coordinates within the selected focus area;
   generating first output information configured to be transmitted to the tactile interface device, based on the selected focus area and the identified input coordinates, wherein
   the output information comprises data for implementing a tactile graphic formed of a plurality of two-dimensional tactile pixels,
   the tactile display includes a first layer and a second layer,
   the first layer includes a tactile icon for executing an instruction to change a displayed image in the focus area of the display screen of the computing device,
   the second layer includes text information in a form of Braille, the text information is information of a tactile graphic element corresponding to the input coordinates,
   the input coordinates are changed in response to the input at the tactile interface device, and
   the text information of the second layer is automatically changed in response to a change of the input coordinates, to be information of another tactile graphic element corresponding to changed input coordinates; and
   generating second output information configured to be transmitted to the tactile interface device, the second output information controls the tactile interface device to perform, while the input coordinates correspond to a location of the tactile graphic element, a periodical movement of at least one tactile pixel of the tactile graphic element corresponding to the input coordinates.

2. The method of claim 1, wherein the generating the information inputted to the application configured to be executed in the computing device comprises:
   classifying a category of the input at the tactile interface device; and
   generating input information in a form to be inputted to the application based on the input, according to the classified category of the input.

3. The method of claim 2, wherein the category of the input comprises Braille information by a Braille key input, input coordinate shift information by a direction key input, and command information by a command key input, and the command information includes at least one of an execution command, a space command, and a preset shortcut command.

4. The method of claim 2, wherein, when the category of the input is input coordinate shift information, the generating the input information comprises generating new input coordinates in the application according to the input coordinate shift information.

5. The method of claim 1, wherein the generating the first output information configured to be transmitted to the tactile interface device comprises:
   determining whether the displayed image in the focus area of the display screen of the computing device is changed; and
   generating, when it is determined that the displayed image is changed, the data for implementing the tactile graphic, according to the determined change.

6. The method of claim 5, wherein the generating the data for implementing the tactile graphic comprises:
   dividing the focus area of the display screen into focus partial areas; and
   converting a display element of each of the focus partial areas into the tactile graphic element according to a preset conversion rule.

7. The method of claim 6, wherein the tactile graphic comprises a plurality of layers, and the focus partial areas correspond to the plurality of layers.

8. The method of claim 5, wherein the data for implementing the tactile graphic comprises data for implementing a tactile graphic element converted from a display element of the display screen according to a preset conversion rule, and a graphic of the display screen or a graphic element formed by simplifying the graphic, and the input coordinates correspond to a position of the tactile graphic element or the graphic element.

9. The method of claim 8, wherein the generating the first output information comprises:
   generating Braille information expressed in the tactile interface device by using a tactile pixel or sound information reproduced in the tactile interface device based on detailed information of the tactile graphic element corresponding to the input coordinates, and wherein the output information to the tactile interface device includes the Braille information or the sound information.

10. A non-transitory computer-readable medium for storing commands for enabling a computing device to perform the steps of:
    generating information inputted to an application configured to be executed in the computing device based on an input in a tactile interface device to interact with a user, including a tactile display;
    selecting a focus area of a display screen of the computing device, based on outputs from the application, and identifying input coordinates within the selected focus area;
    generating first output information configured to be transmitted to the tactile interface device based on the selected focus area and the identified input coordinates, wherein
    the output information includes data for implementing a tactile graphic formed of a plurality of two-dimensional tactile pixels,
    the tactile display includes a first layer and a second layer,
    the first layer includes a tactile icon for executing an instruction to change a displayed image in the focus area of the display screen of the computing device,
    the second layer includes text information in a form of Braille, the text information is information of a tactile graphic element corresponding to the input coordinates,
    the input coordinates are changed in response to the input at the tactile interface device, and the text information of the second layer is automatically changed in response to a change of the input coordinates, to be information of another tactile graphic element corresponding to changed input coordinates; and generating second output information configured to be transmitted to the tactile interface device, the second output information controls the tactile interface device to perform, while the input coordinates correspond to a location of the tactile graphic element, a periodical movement of at least one tactile pixel of the tactile graphic element corresponding to the input coordinates.

11. A computing device including at least one processor and at least one memory and capable of controlling a tactile interface device, the computing device comprising:

an input converting unit configured to generate information inputted to an application configured to be executed in the computing device based on an input from the tactile interface device including a tactile display; and an output converting unit configured to:
select a focus area of a display screen of the computing device, based on outputs from the application, and identifying input coordinates within the selected focus area;
generate first output information configured to be transmitted to the tactile interface device, based on the selected focus area and the identified input coordinates, wherein
the output information includes data for implementing a tactile graphic formed of a plurality of two-dimensional tactile pixels,
the tactile display includes a first layer and a second layer,
the first layer includes a tactile icon for executing an instruction to change a displayed image in the focus area of the display screen of the computing device,
the second layer includes text information in a form of Braille, the text information is information of a tactile graphic element corresponding to the input coordinates,
the input coordinates are changed in response to the input at the tactile interface device, and
the text information of the second layer is automatically changed in response to a change of the input coordinates, to be information of another tactile graphic element corresponding to changed input coordinates; and
generate second output information configured to be transmitted to the tactile interface device, the second output information controls the tactile interface device to perform, while the input coordinates correspond to a location of the tactile graphic element, a periodical movement of at least one tactile pixel of the tactile graphic element corresponding to the input coordinates.

12. The computing device of claim 11, wherein the input converting unit is further configured to
classify a category of the input at the tactile interface device, and
generate input information in a form to be inputted to the application based on the input, according to the classified category of the input.

* * * * *